(12) United States Patent
Sinton et al.

(10) Patent No.: US 9,610,546 B2
(45) Date of Patent: Apr. 4, 2017

(54) SEPARATION MEMBRANES FORMED FROM PERFORATED GRAPHENE AND METHODS FOR USE THEREOF

(71) Applicant: LOCKHEED MARTIN CORPORATION, Bethesda, MD (US)

(72) Inventors: Steven W. Sinton, Palo Alto, CA (US); Peter V. Bedworth, Los Gatos, CA (US); Padraig Moloney, Boston, MA (US); Jacob L. Swett, Redwood City, CA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 14/856,198

(22) Filed: Sep. 16, 2015

(65) Prior Publication Data

US 2016/0074815 A1     Mar. 17, 2016

Related U.S. Application Data

(63) Continuation-in-part of application No. 14/656,580, filed on Mar. 12, 2015.

(Continued)

(51) Int. Cl.
*B01D 71/02* (2006.01)
*B01D 53/22* (2006.01)

(Continued)

(52) U.S. Cl.
CPC ......... *B01D 71/028* (2013.01); *B01D 53/228* (2013.01); *B01D 67/0062* (2013.01);

(Continued)

(58) Field of Classification Search
CPC .............. B01D 53/228; B01D 67/0062; B01D 67/0079; B01D 69/10; B01D 69/12;

(Continued)

(56) References Cited

U.S. PATENT DOCUMENTS

| 2,187,417 A | 1/1940 | Doble |
| 3,501,831 A | 3/1970 | Gordon |

(Continued)

FOREIGN PATENT DOCUMENTS

| CA | 2037988 | 9/1992 |
| CN | 101996853 A | 3/2011 |
| CN | 101996853 B | 8/2012 |
| CN | 102637584 A | 8/2012 |
| CN | 103182249 A | 7/2013 |
| EP | 0 364 628 A1 | 4/1990 |
| EP | 1 034 251 | 1/2004 |
| EP | 2 060 286 | 5/2009 |
| EP | 2 107 120 A1 | 10/2009 |

(Continued)

OTHER PUBLICATIONS

Adiga et al., "Nanoporous Materials for Biomedical Devices," JOM 60: 26-32 (Mar. 25, 2008).

(Continued)

*Primary Examiner* — Jason M Greene
(74) *Attorney, Agent, or Firm* — Foley & Lardner LLP

(57) ABSTRACT

Perforated graphene sheets can be used in forming separation membranes. Separation membranes of the present disclosure, which can be used in gas separation processes in some embodiments, can include one or more layers of perforated graphene and one or more layers of another membrane material. Methods for separating a gas mixture can include contacting a gas mixture with the separation membranes, and transiting one or more of the gases through the perforated graphene so as to affect separation.

20 Claims, 1 Drawing Sheet

Related U.S. Application Data

(60) Provisional application No. 61/951,930, filed on Mar. 12, 2014.

(51) Int. Cl.
*B01D 69/12* (2006.01)
*C10L 3/10* (2006.01)
*B01D 67/00* (2006.01)
*B01D 69/02* (2006.01)

(52) U.S. Cl.
CPC ......... *B01D 67/0079* (2013.01); *B01D 69/02* (2013.01); *B01D 69/12* (2013.01); *B01D 71/021* (2013.01); *C10L 3/101* (2013.01); *C10L 3/104* (2013.01); *B01D 2053/221* (2013.01); *B01D 2256/245* (2013.01); *B01D 2257/304* (2013.01); *B01D 2257/504* (2013.01); *B01D 2257/80* (2013.01); *B01D 2325/20* (2013.01); *B01D 2325/22* (2013.01); *C10L 3/103* (2013.01); *C10L 3/106* (2013.01); *C10L 2290/548* (2013.01); *Y02C 10/10* (2013.01)

(58) Field of Classification Search
CPC ................ B01D 71/021; B01D 71/028; B01D 2256/245; B01D 2257/304; B01D 2257/504; B01D 2257/80; C10L 3/103; C10L 3/104; C10L 3/106; C10L 2290/548
See application file for complete search history.

(56) References Cited

U.S. PATENT DOCUMENTS

| | | |
|---|---|---|
| 3,593,854 A | 7/1971 | Swank |
| 3,701,433 A | 10/1972 | Krakauer et al. |
| 4,073,732 A | 2/1978 | Lauer et al. |
| 4,159,954 A | 7/1979 | Gangemi |
| 4,162,220 A | 7/1979 | Servas |
| 4,303,530 A | 12/1981 | Shah et al. |
| 4,743,371 A | 5/1988 | Servas et al. |
| 4,925,560 A | 5/1990 | Sorrick |
| 4,935,207 A | 6/1990 | Stanbro et al. |
| 4,976,858 A | 12/1990 | Kadoya |
| 5,080,770 A | 1/1992 | Culkin |
| 5,156,628 A | 10/1992 | Kranz |
| 5,182,111 A | 1/1993 | Aebischer et al. |
| 5,185,086 A | 2/1993 | Kaali et al. |
| 5,201,767 A | 4/1993 | Caldarise et al. |
| 5,244,981 A | 9/1993 | Seidner et al. |
| 5,314,492 A | 5/1994 | Hamilton et al. |
| 5,314,960 A | 5/1994 | Spinelli et al. |
| 5,314,961 A | 5/1994 | Anton et al. |
| 5,331,067 A | 7/1994 | Seidner et al. |
| 5,371,147 A | 12/1994 | Spinelli et al. |
| 5,425,858 A | 6/1995 | Farmer |
| 5,480,449 A | 1/1996 | Hamilton et al. |
| 5,514,181 A | 5/1996 | Light et al. |
| 5,516,522 A | 5/1996 | Peyman et al. |
| 5,549,697 A | 8/1996 | Caldarise |
| 5,562,944 A | 10/1996 | Kafrawy |
| 5,565,210 A | 10/1996 | Rosenthal et al. |
| 5,580,530 A | 12/1996 | Kowatsch et al. |
| 5,595,621 A | 1/1997 | Light et al. |
| 5,636,437 A | 6/1997 | Kaschmitter et al. |
| 5,639,275 A | 6/1997 | Baetge et al. |
| 5,641,323 A | 6/1997 | Caldarise |
| 5,658,334 A | 8/1997 | Caldarise et al. |
| 5,662,158 A | 9/1997 | Caldarise |
| 5,665,118 A | 9/1997 | LaSalle et al. |
| 5,679,232 A | 10/1997 | Fedor et al. |
| 5,687,788 A | 11/1997 | Caldarise et al. |
| 5,700,477 A | 12/1997 | Rosenthal et al. |
| 5,713,410 A | 2/1998 | LaSalle et al. |
| 5,716,412 A | 2/1998 | DeCarlo et al. |
| 5,716,414 A | 2/1998 | Caldarise |
| 5,725,586 A | 3/1998 | Sommerich |
| 5,731,360 A | 3/1998 | Pekala et al. |
| 5,733,503 A | 3/1998 | Kowatsch et al. |
| 5,746,272 A | 5/1998 | Mastrorio et al. |
| 5,782,286 A | 7/1998 | Sommerich |
| 5,782,289 A | 7/1998 | Mastrorio et al. |
| 5,788,916 A | 8/1998 | Caldarise |
| 5,808,312 A | 9/1998 | Fukuda |
| 5,868,727 A | 2/1999 | Barr et al. |
| 5,897,592 A | 4/1999 | Caldarise et al. |
| 5,902,762 A | 5/1999 | Mercuri et al. |
| 5,906,234 A | 5/1999 | Mastrorio et al. |
| 5,910,172 A | 6/1999 | Penenberg |
| 5,910,173 A | 6/1999 | DeCarlo et al. |
| 5,932,185 A | 8/1999 | Pekala et al. |
| 5,935,084 A | 8/1999 | Southworth |
| 5,935,172 A | 8/1999 | Ochoa et al. |
| 5,954,937 A | 9/1999 | Farmer |
| 5,976,555 A | 11/1999 | Liu et al. |
| 5,980,718 A | 11/1999 | Van Konynenburg et al. |
| 6,008,431 A | 12/1999 | Caldarise et al. |
| 6,013,080 A | 1/2000 | Khalili |
| 6,022,509 A | 2/2000 | Matthews et al. |
| 6,052,608 A | 4/2000 | Young et al. |
| 6,080,393 A | 6/2000 | Liu et al. |
| 6,093,209 A | 7/2000 | Sanders |
| 6,139,585 A | 10/2000 | Li |
| 6,152,882 A | 11/2000 | Prutchi |
| 6,156,323 A | 12/2000 | Verdicchio et al. |
| 6,193,956 B1 | 2/2001 | Liu et al. |
| 6,209,621 B1 | 4/2001 | Treacy |
| 6,213,124 B1 | 4/2001 | Butterworth |
| 6,228,123 B1 | 5/2001 | Dezzani |
| 6,264,699 B1 | 7/2001 | Noiles et al. |
| 6,292,704 B1 | 9/2001 | Malonek et al. |
| 6,309,532 B1 | 10/2001 | Tran et al. |
| 6,346,187 B1 | 2/2002 | Tran et al. |
| 6,375,014 B1 | 4/2002 | Garcera et al. |
| 6,426,214 B1 | 7/2002 | Butler et al. |
| 6,454,095 B1 | 9/2002 | Brisebois et al. |
| 6,461,622 B2 | 10/2002 | Liu et al. |
| 6,462,935 B1 | 10/2002 | Shiue et al. |
| 6,521,865 B1 | 2/2003 | Jones et al. |
| 6,532,386 B2 | 3/2003 | Sun et al. |
| 6,580,598 B2 | 6/2003 | Shiue et al. |
| 6,654,229 B2 | 11/2003 | Yanagisawa et al. |
| 6,659,298 B2 | 12/2003 | Wong |
| 6,660,150 B2 | 12/2003 | Conlan et al. |
| 6,661,643 B2 | 12/2003 | Shiue et al. |
| 6,692,627 B1 | 2/2004 | Russell et al. |
| 6,695,880 B1 | 2/2004 | Roffman et al. |
| 6,699,684 B2 | 3/2004 | Ho et al. |
| 6,719,740 B2 | 4/2004 | Burnett et al. |
| 6,905,612 B2 | 6/2005 | Dorian et al. |
| 6,924,190 B2 | 8/2005 | Dennison |
| 7,014,829 B2 | 3/2006 | Yanagisawa et al. |
| 7,071,406 B2 | 7/2006 | Smalley et al. |
| 7,092,753 B2 | 8/2006 | Darvish et al. |
| 7,138,042 B2 | 11/2006 | Tran et al. |
| 7,171,263 B2 | 1/2007 | Darvish et al. |
| 7,175,783 B2 | 2/2007 | Curran |
| 7,179,419 B2 | 2/2007 | Lin et al. |
| 7,190,997 B1 | 3/2007 | Darvish et al. |
| 7,267,753 B2 | 9/2007 | Anex et al. |
| 7,306,768 B2 | 12/2007 | Chiga |
| 7,357,255 B2 | 4/2008 | Ginsberg et al. |
| 7,381,707 B2 | 6/2008 | Lin et al. |
| 7,382,601 B2 | 6/2008 | Yoshimitsu |
| 7,434,692 B2 | 10/2008 | Ginsberg et al. |
| 7,452,547 B2 | 11/2008 | Lambino et al. |
| 7,459,121 B2 | 12/2008 | Liang et al. |
| 7,460,907 B1 | 12/2008 | Darvish et al. |
| 7,476,222 B2 | 1/2009 | Sun et al. |
| 7,477,939 B2 | 1/2009 | Sun et al. |
| 7,477,940 B2 | 1/2009 | Sun et al. |
| 7,477,941 B2 | 1/2009 | Sun et al. |
| 7,479,133 B2 | 1/2009 | Sun et al. |

(56) References Cited

U.S. PATENT DOCUMENTS

| | | |
|---|---|---|
| 7,505,250 B2 | 3/2009 | Cho et al. |
| 7,600,567 B2 | 10/2009 | Christopher et al. |
| 7,631,764 B2 | 12/2009 | Ginsberg et al. |
| 7,650,805 B2 | 1/2010 | Nauseda et al. |
| 7,674,477 B1 | 3/2010 | Schmid et al. |
| 7,706,128 B2 | 4/2010 | Bourcier |
| 7,761,809 B2 | 7/2010 | Bukovec et al. |
| 7,786,086 B2 | 8/2010 | Reches et al. |
| 7,866,475 B2 | 1/2011 | Doskoczynski et al. |
| 7,875,293 B2 | 1/2011 | Shults et al. |
| 7,935,331 B2 | 5/2011 | Lin |
| 7,935,416 B2 | 5/2011 | Yang et al. |
| 7,943,167 B2 | 5/2011 | Kulkarni et al. |
| 7,960,708 B2 | 6/2011 | Wolfe et al. |
| 7,998,246 B2 | 8/2011 | Liu et al. |
| 8,147,599 B2 | 4/2012 | McAlister |
| 8,308,702 B2 | 11/2012 | Batchvarova et al. |
| 8,316,865 B2 | 11/2012 | Ochs et al. |
| 8,329,476 B2 | 12/2012 | Pitkanen et al. |
| 8,361,321 B2 | 1/2013 | Stetson et al. |
| 8,449,504 B2 | 5/2013 | Carter et al. |
| 8,475,689 B2 | 7/2013 | Sun et al. |
| 8,513,324 B2 | 8/2013 | Scales et al. |
| 8,535,726 B2 | 9/2013 | Dai et al. |
| 8,617,411 B2 | 12/2013 | Singh |
| 8,666,471 B2 | 3/2014 | Rogers et al. |
| 8,698,481 B2 | 4/2014 | Lieber et al. |
| 8,715,329 B2 | 5/2014 | Robinson et al. |
| 8,721,074 B2 | 5/2014 | Pugh et al. |
| 8,734,421 B2 | 5/2014 | Sun et al. |
| 8,744,567 B2 | 6/2014 | Fassih et al. |
| 8,751,015 B2 | 6/2014 | Frewin et al. |
| 8,759,153 B2 | 6/2014 | Elian et al. |
| 8,808,257 B2 | 8/2014 | Pugh et al. |
| 8,828,211 B2 | 9/2014 | Garaj et al. |
| 8,840,552 B2 | 9/2014 | Brauker et al. |
| 8,857,983 B2 | 10/2014 | Pugh et al. |
| 8,894,201 B2 | 11/2014 | Pugh et al. |
| 8,940,552 B2 | 1/2015 | Pugh et al. |
| 8,950,862 B2 | 2/2015 | Pugh et al. |
| 8,974,055 B2 | 3/2015 | Pugh et al. |
| 8,975,121 B2 | 3/2015 | Pugh et al. |
| 8,986,932 B2 | 3/2015 | Turner et al. |
| 8,993,234 B2 | 3/2015 | Turner et al. |
| 8,993,327 B2 | 3/2015 | McKnight et al. |
| 9,014,639 B2 | 4/2015 | Pugh et al. |
| 9,017,937 B1 | 4/2015 | Turner et al. |
| 9,028,663 B2 | 5/2015 | Stetson et al. |
| 9,045,847 B2 | 6/2015 | Batchvarova et al. |
| 9,050,452 B2 | 6/2015 | Sun et al. |
| 9,052,533 B2 | 6/2015 | Pugh et al. |
| 9,062,180 B2 | 6/2015 | Scales et al. |
| 9,067,811 B1 | 6/2015 | Bennett et al. |
| 9,070,615 B2 | 6/2015 | Elian et al. |
| 9,080,267 B2 | 7/2015 | Batchvarova et al. |
| 9,095,823 B2 | 8/2015 | Fleming |
| 9,102,111 B2 | 8/2015 | Pugh et al. |
| 9,110,310 B2 | 8/2015 | Pugh et al. |
| 9,125,715 B2 | 9/2015 | Pugh et al. |
| 9,134,546 B2 | 9/2015 | Pugh et al. |
| 9,170,646 B2 | 10/2015 | Toner et al. |
| 9,185,486 B2 | 11/2015 | Pugh |
| 9,193,587 B2 | 11/2015 | Bennett |
| 9,195,075 B2 | 11/2015 | Pugh et al. |
| 9,225,375 B2 | 12/2015 | Pugh et al. |
| 2001/0036556 A1 | 11/2001 | Jen |
| 2001/0047157 A1 | 11/2001 | Burnett et al. |
| 2001/0055597 A1 | 12/2001 | Liu et al. |
| 2002/0079004 A1 | 6/2002 | Sato et al. |
| 2002/0079054 A1 | 6/2002 | Nakatani |
| 2002/0115957 A1 | 8/2002 | Sun et al. |
| 2002/0183682 A1 | 12/2002 | Darvish et al. |
| 2002/0183686 A1 | 12/2002 | Darvish et al. |
| 2003/0052354 A1 | 3/2003 | Dennison |
| 2003/0134281 A1 | 7/2003 | Evans |
| 2003/0138777 A1 | 7/2003 | Evans |
| 2003/0159985 A1 | 8/2003 | Siwy et al. |
| 2004/0061253 A1 | 4/2004 | Kleinmeyer et al. |
| 2004/0063097 A1 | 4/2004 | Evans |
| 2004/0111968 A1 | 6/2004 | Day et al. |
| 2004/0112865 A1 | 6/2004 | McCullough et al. |
| 2004/0121488 A1 | 6/2004 | Chang et al. |
| 2004/0142463 A1 | 7/2004 | Walker et al. |
| 2004/0185730 A1 | 9/2004 | Lambino et al. |
| 2004/0193043 A1 | 9/2004 | Duchon et al. |
| 2004/0217036 A1 | 11/2004 | Ginsberg et al. |
| 2004/0241214 A1 | 12/2004 | Kirkwood et al. |
| 2004/0251136 A1 | 12/2004 | Lean et al. |
| 2005/0004508 A1 | 1/2005 | Sun et al. |
| 2005/0004509 A1 | 1/2005 | Sun et al. |
| 2005/0004550 A1 | 1/2005 | Sun et al. |
| 2005/0010161 A1 | 1/2005 | Sun et al. |
| 2005/0010192 A1 | 1/2005 | Sun et al. |
| 2005/0015042 A1 | 1/2005 | Sun et al. |
| 2005/0053563 A1 | 3/2005 | Manissier et al. |
| 2005/0112078 A1 | 5/2005 | Boddupalli et al. |
| 2005/0129633 A1 | 6/2005 | Lin |
| 2005/0148996 A1 | 7/2005 | Sun et al. |
| 2005/0189673 A1 | 9/2005 | Klug et al. |
| 2005/0226834 A1 | 10/2005 | Lambino et al. |
| 2005/0238730 A1 | 10/2005 | Le Fur et al. |
| 2006/0073370 A1 | 4/2006 | Krusic et al. |
| 2006/0093885 A1 | 5/2006 | Krusic et al. |
| 2006/0166347 A1 | 7/2006 | Faulstich et al. |
| 2006/0180604 A1 | 8/2006 | Ginsberg et al. |
| 2006/0222701 A1 | 10/2006 | Kulkarni et al. |
| 2006/0253078 A1 | 11/2006 | Wu et al. |
| 2007/0004640 A1 | 1/2007 | Lin et al. |
| 2007/0032054 A1 | 2/2007 | Ramaswamy et al. |
| 2007/0060862 A1 | 3/2007 | Sun et al. |
| 2007/0099813 A1 | 5/2007 | Luizzi et al. |
| 2007/0284279 A1 | 12/2007 | Doskoczynski et al. |
| 2008/0017564 A1 | 1/2008 | Hammond |
| 2008/0035484 A1 | 2/2008 | Wu et al. |
| 2008/0035541 A1 | 2/2008 | Franzreb et al. |
| 2008/0045877 A1 | 2/2008 | Levin et al. |
| 2008/0063585 A1 | 3/2008 | Smalley et al. |
| 2008/0081323 A1 | 4/2008 | Keeley et al. |
| 2008/0081362 A1 | 4/2008 | Keeley et al. |
| 2008/0156648 A1 | 7/2008 | Dudziak et al. |
| 2008/0185293 A1 | 8/2008 | Klose et al. |
| 2008/0188836 A1 | 8/2008 | Weber et al. |
| 2008/0241085 A1 | 10/2008 | Lin et al. |
| 2008/0268016 A1 | 10/2008 | Fang et al. |
| 2008/0290020 A1 | 11/2008 | Marand et al. |
| 2008/0290111 A1 | 11/2008 | Ginsberg et al. |
| 2009/0039019 A1 | 2/2009 | Raman |
| 2009/0048685 A1 | 2/2009 | Frigstad et al. |
| 2009/0075371 A1 | 3/2009 | Keeley et al. |
| 2009/0087395 A1 | 4/2009 | Lin et al. |
| 2009/0117335 A1 | 5/2009 | Iyoda et al. |
| 2009/0148495 A1 | 6/2009 | Hammer et al. |
| 2009/0222072 A1 | 9/2009 | Robinson et al. |
| 2009/0241242 A1 | 10/2009 | Beatty et al. |
| 2009/0291270 A1 | 11/2009 | Zettl et al. |
| 2009/0294300 A1 | 12/2009 | Kanzius et al. |
| 2009/0306364 A1 | 12/2009 | Beer et al. |
| 2010/0021708 A1 | 1/2010 | Kong et al. |
| 2010/0024722 A1 | 2/2010 | Ochs et al. |
| 2010/0024838 A1 | 2/2010 | Ochs et al. |
| 2010/0025330 A1 | 2/2010 | Ratto et al. |
| 2010/0055464 A1 | 3/2010 | Sung |
| 2010/0059378 A1 | 3/2010 | Elson et al. |
| 2010/0072643 A1 | 3/2010 | Pugh et al. |
| 2010/0076553 A1 | 3/2010 | Pugh et al. |
| 2010/0110372 A1 | 5/2010 | Pugh et al. |
| 2010/0127312 A1 | 5/2010 | Grebel et al. |
| 2010/0161014 A1 | 6/2010 | Lynch et al. |
| 2010/0167551 A1 | 7/2010 | Dedontney |
| 2010/0209515 A1 | 8/2010 | Chantalat et al. |
| 2010/0213079 A1 | 8/2010 | Willis |
| 2010/0228204 A1 | 9/2010 | Beatty et al. |
| 2010/0233781 A1 | 9/2010 | Bangera et al. |
| 2010/0249273 A1 | 9/2010 | Scales et al. |

(56) References Cited

U.S. PATENT DOCUMENTS

| | | |
|---|---|---|
| 2010/0327847 A1 | 12/2010 | Leiber et al. |
| 2011/0014217 A1 | 1/2011 | Fahmy et al. |
| 2011/0041687 A1 | 2/2011 | Diaz et al. |
| 2011/0054418 A1 | 3/2011 | Pugh et al. |
| 2011/0054576 A1 | 3/2011 | Robinson et al. |
| 2011/0092949 A1 | 4/2011 | Wang |
| 2011/0100921 A1 | 5/2011 | Heinrich |
| 2011/0112484 A1 | 5/2011 | Carter et al. |
| 2011/0118655 A1 | 5/2011 | Fassih et al. |
| 2011/0120970 A1 | 5/2011 | Joo et al. |
| 2011/0139707 A1 | 6/2011 | Siwy et al. |
| 2011/0152795 A1 | 6/2011 | Aledo et al. |
| 2011/0258791 A1 | 10/2011 | Batchvarova et al. |
| 2011/0258796 A1 | 10/2011 | Batchvarova et al. |
| 2011/0262645 A1 | 10/2011 | Batchvarova et al. |
| 2011/0269920 A1 | 11/2011 | Min et al. |
| 2012/0031833 A1 | 2/2012 | Ho et al. |
| 2012/0048804 A1 | 3/2012 | Stetson et al. |
| 2012/0116228 A1 | 5/2012 | Okubo |
| 2012/0145548 A1 | 6/2012 | Sivan et al. |
| 2012/0148633 A1 | 6/2012 | Sun et al. |
| 2012/0162600 A1 | 6/2012 | Pugh et al. |
| 2012/0183738 A1 | 7/2012 | Zettl et al. |
| 2012/0218508 A1 | 8/2012 | Pugh et al. |
| 2012/0220053 A1 | 8/2012 | Lee et al. |
| 2012/0234453 A1 | 9/2012 | Pugh et al. |
| 2012/0234679 A1 | 9/2012 | Garaj et al. |
| 2012/0235277 A1 | 9/2012 | Pugh et al. |
| 2012/0236254 A1 | 9/2012 | Pugh et al. |
| 2012/0236524 A1 | 9/2012 | Pugh et al. |
| 2012/0242953 A1 | 9/2012 | Pugh et al. |
| 2012/0255899 A1* | 10/2012 | Choi .................. B01D 53/228 210/489 |
| 2012/0267337 A1 | 10/2012 | Striemer et al. |
| 2013/0015136 A1 | 1/2013 | Bennett |
| 2013/0034760 A1 | 2/2013 | Otts et al. |
| 2013/0045523 A1 | 2/2013 | Leach et al. |
| 2013/0056367 A1 | 3/2013 | Martinez et al. |
| 2013/0071941 A1 | 3/2013 | Miller |
| 2013/0096292 A1 | 4/2013 | Brahmasandra et al. |
| 2013/0105417 A1 | 5/2013 | Stetson et al. |
| 2013/0116541 A1 | 5/2013 | Gracias et al. |
| 2013/0131214 A1 | 5/2013 | Scales et al. |
| 2013/0135578 A1 | 5/2013 | Pugh et al. |
| 2013/0146480 A1 | 6/2013 | Garaj et al. |
| 2013/0152386 A1 | 6/2013 | Pandojirao-S et al. |
| 2013/0174978 A1 | 7/2013 | Pugh et al. |
| 2013/0192460 A1 | 8/2013 | Miller et al. |
| 2013/0192461 A1 | 8/2013 | Miller et al. |
| 2013/0194540 A1 | 8/2013 | Pugh et al. |
| 2013/0213568 A1 | 8/2013 | Pugh et al. |
| 2013/0215377 A1 | 8/2013 | Pugh et al. |
| 2013/0215378 A1 | 8/2013 | Pugh et al. |
| 2013/0215380 A1 | 8/2013 | Pugh et al. |
| 2013/0216581 A1 | 8/2013 | Fahmy et al. |
| 2013/0240355 A1 | 9/2013 | Ho et al. |
| 2013/0248097 A1 | 9/2013 | Ploss, Jr. |
| 2013/0248367 A1 | 9/2013 | Stetson et al. |
| 2013/0249147 A1 | 9/2013 | Bedworth |
| 2013/0256118 A1 | 10/2013 | Meller et al. |
| 2013/0256139 A1 | 10/2013 | Peng |
| 2013/0256154 A1 | 10/2013 | Peng |
| 2013/0256210 A1 | 10/2013 | Fleming |
| 2013/0256211 A1 | 10/2013 | Fleming |
| 2013/0261568 A1 | 10/2013 | Martinson et al. |
| 2013/0270188 A1 | 10/2013 | Karnik et al. |
| 2013/0277305 A1 | 10/2013 | Stetson et al. |
| 2013/0295150 A1 | 11/2013 | Chantalat et al. |
| 2013/0317131 A1 | 11/2013 | Scales et al. |
| 2013/0317132 A1 | 11/2013 | Scales et al. |
| 2013/0317133 A1 | 11/2013 | Scales et al. |
| 2013/0323295 A1 | 12/2013 | Scales et al. |
| 2013/0338611 A1 | 12/2013 | Pugh et al. |
| 2013/0338744 A1 | 12/2013 | Frewin et al. |
| 2014/0002788 A1 | 1/2014 | Otts et al. |
| 2014/0005514 A1 | 1/2014 | Pugh et al. |
| 2014/0015160 A1 | 1/2014 | Kung et al. |
| 2014/0017322 A1 | 1/2014 | Dai et al. |
| 2014/0066958 A1 | 3/2014 | Priewe |
| 2014/0093728 A1 | 4/2014 | Shah et al. |
| 2014/0128891 A1 | 5/2014 | Astani-Matthies et al. |
| 2014/0141521 A1 | 5/2014 | Peng et al. |
| 2014/0154464 A1 | 6/2014 | Miller et al. |
| 2014/0170195 A1 | 6/2014 | Fassih et al. |
| 2014/0171541 A1 | 6/2014 | Scales et al. |
| 2014/0174927 A1 | 6/2014 | Bashir et al. |
| 2014/0190004 A1 | 7/2014 | Riall et al. |
| 2014/0192313 A1 | 7/2014 | Riall et al. |
| 2014/0192314 A1 | 7/2014 | Riall et al. |
| 2014/0199777 A2 | 7/2014 | Ruiz et al. |
| 2014/0230653 A1 | 8/2014 | Yu et al. |
| 2014/0230733 A1 | 8/2014 | Miller |
| 2014/0248621 A1 | 9/2014 | Collins |
| 2014/0257348 A1 | 9/2014 | Priewe et al. |
| 2014/0257517 A1 | 9/2014 | Deichmann et al. |
| 2014/0259657 A1 | 9/2014 | Riall et al. |
| 2014/0261999 A1 | 9/2014 | Stetson et al. |
| 2014/0263035 A1 | 9/2014 | Stoltenberg et al. |
| 2014/0263178 A1 | 9/2014 | Sinton et al. |
| 2014/0264977 A1 | 9/2014 | Pugh et al. |
| 2014/0268015 A1 | 9/2014 | Riall et al. |
| 2014/0268020 A1 | 9/2014 | Pugh et al. |
| 2014/0268021 A1 | 9/2014 | Pugh et al. |
| 2014/0268026 A1 | 9/2014 | Pugh et al. |
| 2014/0272286 A1 | 9/2014 | Stoltenberg et al. |
| 2014/0272522 A1 | 9/2014 | Pugh et al. |
| 2014/0273315 A1 | 9/2014 | Pugh et al. |
| 2014/0273316 A1 | 9/2014 | Pugh et al. |
| 2014/0276481 A1 | 9/2014 | Pugh et al. |
| 2014/0276999 A1 | 9/2014 | Harms et al. |
| 2014/0306361 A1 | 10/2014 | Pugh et al. |
| 2014/0308681 A1 | 10/2014 | Strano et al. |
| 2014/0315213 A1 | 10/2014 | Nagrath et al. |
| 2014/0322518 A1 | 10/2014 | Addleman et al. |
| 2014/0333892 A1 | 11/2014 | Pugh et al. |
| 2014/0335661 A1 | 11/2014 | Pugh et al. |
| 2014/0343580 A1 | 11/2014 | Priewe |
| 2014/0346081 A1 | 11/2014 | Sowden et al. |
| 2014/0350372 A1 | 11/2014 | Pugh et al. |
| 2014/0377738 A1 | 12/2014 | Bachmann et al. |
| 2015/0015843 A1 | 1/2015 | Pugh et al. |
| 2015/0017918 A1 | 1/2015 | Pugh et al. |
| 2015/0057762 A1 | 2/2015 | Harms et al. |
| 2015/0061990 A1 | 3/2015 | Toner et al. |
| 2015/0062533 A1 | 3/2015 | Toner et al. |
| 2015/0063605 A1 | 3/2015 | Pugh |
| 2015/0066063 A1 | 3/2015 | Priewe |
| 2015/0075667 A1 | 3/2015 | McHugh et al. |
| 2015/0077658 A1 | 3/2015 | Pugh et al. |
| 2015/0077659 A1 | 3/2015 | Pugh et al. |
| 2015/0077660 A1 | 3/2015 | Pugh et al. |
| 2015/0077661 A1 | 3/2015 | Pugh et al. |
| 2015/0077662 A1 | 3/2015 | Pugh et al. |
| 2015/0077663 A1 | 3/2015 | Pugh et al. |
| 2015/0077699 A1 | 3/2015 | De Sio et al. |
| 2015/0077702 A9 | 3/2015 | Pugh et al. |
| 2015/0079683 A1 | 3/2015 | Yager et al. |
| 2015/0087249 A1 | 3/2015 | Pugh et al. |
| 2015/0098910 A1 | 4/2015 | Mordas et al. |
| 2015/0101931 A1 | 4/2015 | Garaj et al. |
| 2015/0105686 A1 | 4/2015 | Vasan |
| 2015/0118318 A1 | 4/2015 | Fahmy et al. |
| 2015/0122727 A1 | 5/2015 | Karnik et al. |
| 2015/0138454 A1 | 5/2015 | Pugh et al. |
| 2015/0142107 A1 | 5/2015 | Pugh et al. |
| 2015/0145155 A1 | 5/2015 | Pugh et al. |
| 2015/0146162 A1 | 5/2015 | Pugh et al. |
| 2015/0147474 A1 | 5/2015 | Batchvarova et al. |
| 2015/0174253 A1 | 6/2015 | Sun et al. |
| 2015/0174254 A1 | 6/2015 | Sun et al. |
| 2015/0182473 A1 | 7/2015 | Bosnyak et al. |
| 2015/0185180 A1 | 7/2015 | Ruhl et al. |
| 2015/0196579 A1 | 7/2015 | Ferrante et al. |
| 2015/0202351 A1 | 7/2015 | Kaplan et al. |

(56) References Cited

U.S. PATENT DOCUMENTS

| | | |
|---|---|---|
| 2015/0212339 A1 | 7/2015 | Pugh et al. |
| 2015/0217219 A1 | 8/2015 | Sinsabaugh et al. |
| 2015/0218210 A1 | 8/2015 | Stetson et al. |
| 2015/0221474 A1 | 8/2015 | Bedworth |
| 2015/0247178 A1 | 9/2015 | Mountcastle et al. |
| 2015/0258254 A1 | 9/2015 | Simon et al. |
| 2015/0258498 A1 | 9/2015 | Simon et al. |
| 2015/0258502 A1 | 9/2015 | Turowski |
| 2015/0258503 A1 | 9/2015 | Sinton et al. |
| 2015/0258525 A1 | 9/2015 | Westman et al. |
| 2015/0268150 A1 | 9/2015 | Newkirk et al. |
| 2015/0272834 A1 | 10/2015 | Sun et al. |
| 2015/0272896 A1 | 10/2015 | Sun et al. |
| 2015/0273401 A1* | 10/2015 | Miller ............ B01D 71/021 210/500.25 |
| 2015/0309337 A1 | 10/2015 | Flitsch et al. |
| 2015/0321147 A1 | 11/2015 | Fleming et al. |
| 2015/0323811 A1 | 11/2015 | Flitsch et al. |
| 2015/0336202 A1 | 11/2015 | Bedworth et al. |
| 2015/0342900 A1 | 12/2015 | Putnins |
| 2015/0346382 A1 | 12/2015 | Bliven et al. |
| 2015/0351887 A1 | 12/2015 | Peters |
| 2015/0359742 A1 | 12/2015 | Fassih et al. |
| 2015/0378176 A1 | 12/2015 | Flitsch et al. |
| 2016/0009049 A1 | 1/2016 | Stoltenberg et al. |
| 2016/0038885 A1 | 2/2016 | Hogen-Esch et al. |
| 2016/0058932 A1 | 3/2016 | Stetson et al. |
| 2016/0067390 A1 | 3/2016 | Simon et al. |
| 2016/0074814 A1 | 3/2016 | Park et al. |
| 2016/0074815 A1 | 3/2016 | Sinton et al. |
| 2016/0339160 A1 | 11/2016 | Bedworth et al. |

FOREIGN PATENT DOCUMENTS

| | | |
|---|---|---|
| EP | 2 230 511 A1 | 9/2010 |
| KR | 1020110084110 | 7/2011 |
| KR | 1020120022164 A | 3/2012 |
| WO | WO-98/30501 A2 | 7/1998 |
| WO | WO-00/70012 | 11/2000 |
| WO | WO-02/055539 A1 | 7/2002 |
| WO | WO-2004/009840 A1 | 1/2004 |
| WO | WO-2007/103411 A2 | 9/2007 |
| WO | WO-2007/140252 A1 | 12/2007 |
| WO | WO-2010/115904 A1 | 10/2010 |
| WO | WO-2011/019686 A1 | 2/2011 |
| WO | WO-2011/063458 A1 | 6/2011 |
| WO | WO-2011/094204 A2 | 8/2011 |
| WO | WO-2011/100458 A2 | 8/2011 |
| WO | WO-2011/138689 A2 | 11/2011 |
| WO | WO-2012/006657 A1 | 1/2012 |
| WO | WO-2012/021801 A2 | 2/2012 |
| WO | WO-2012/030368 A1 | 3/2012 |
| WO | WO-2012/138671 A2 | 10/2012 |
| WO | WO-2013/048063 A1 | 4/2013 |
| WO | WO-2013/138698 A1 | 9/2013 |
| WO | WO-2013/152179 A1 | 10/2013 |
| WO | WO-2014/084861 A1 | 6/2014 |
| WO | WO-2014/168629 A1 | 10/2014 |
| WO | WO-2015/030698 A1 | 3/2015 |
| WO | WO-2015/138736 A1 | 9/2015 |
| WO | WO-2015/138752 A1 | 9/2015 |
| WO | WO-2015/138771 A1 | 9/2015 |
| WO | WO-2015/197217 | 12/2015 |

OTHER PUBLICATIONS

Allen et al., "Craters on silicon surfaces created by gas cluster ion impacts," Journal of Applied Physics, 92(7): 3671-8 (Oct. 2002).

AMI Applied Membranes Inc. (undated). FilmTec Nanofiltration Membrane Elements. Retrieved Jun. 1, 2016, from http://www.appliedmembranes.com/filmtec-nanofiltration-membrane-elements.html.

Apel, "Track etching technique in membrane technology," Radiation Measurements 34(1-6): 559-566 (Jun. 2001).

Atmeh et al., "Albumin Aggregates: Hydrodynamic Shape and Physico-Chemical Properties," Jordan Journal of Chemistry, 2(2): 169-182 (2007).

Bae et al., "Roll-to-roll production of 30-inch graphene films for transparent electrodes," Nature Nanotechnology 5: 574-578 (Jun. 20, 2010).

Bai et al., "Graphene nanomesh," Nature Nanotechnology 5: 190-194 (Feb. 14, 2010).

Baker. (2004). "Track-etch Membranes." In Membrane Technology and Applications (2nd ed., pp. 92-94). West Sussex, England: John Wiley & Sons.

Butler et al. "Progress, Challenges, and Opportunities in Two-Dimensional Materials Beyond Graphene", Materials Review 7(4): 2898-2926 (Mar. 6, 2013).

Chen et al., "Mechanically Strong, Electrically Conductive, and Biocompatible Graphene Paper," Adv. Mater., 20(18): 3557-3561 (Sep. 2008) (available online Jul. 2008).

Chhowalla et al., "The chemistry of two-dimensional layered transition metal dichalcogenide nanosheets," Nature Chemistry 5: 263-275 (Mar. 20, 2013).

Childres et al., "Effect of oxygen plasma etching on graphene studied using Raman spectroscopy and electronic transport measurements," New Journal of Physics 13 (Feb. 10, 2011).

Clochard. (undated). Radiografted track-etched polymer membranes for research and application [Scholarly project]. In Laboratoire Des Solides Irradiés. Retrieved Jun. 2, 2016, from http://iramis.cea.fr/radiolyse/5juin2015/Clochard.pdf.

Cohen-Tanugi et al, "Water Desalination across Nanoporous Graphene," ACS Nano Letters 12(7): 3602-3608 (Jun. 5, 2012).

Colton, "Implantable biohybrid artificial organs," Cell Transplantation 4(4): 415-436 (Jul.-Aug. 1995).

Desai et al., "Nanoporous microsystems for islet cell replacement," Advanced Drug Delivery Reviews 56: 1661-1673 (Jul. 23, 2004).

Dong et al., "Growth of large-sized graphene thin-films by liquid precursor-based chemical vapor deposition under atmospheric pressure," Carbon 49(11): 3672-3678 (May 2011).

Fischbein et al., "Electron beam nanosculpting of suspended graphene sheets," Applied Physics Letters 93(113107): 1-3, (Sep. 16, 2008).

Fissell et al., "High-Performance Silicon Nanopore Hemofiltration Membranes," NIH-PA Author Manuscript, PMC, (Jan. 5, 2010), also published in J. Memb. Sci. 326(1): 58-63 (Jan. 5, 2009).

Fuertes et al., "Carbon composite membranes from Matrimid® and Kapton® polyimides for gas separation," Microporous and Mesoporous Materials, 33: 115-125 (Dec. 1999).

Galashev, "Computer study of the removal of Cu from the graphene surface using Ar clusters," Computational Materials Science, 98:123-128 (Feb. 2015) (available online Nov. 2014).

Gimi et al., "A Nanoporous, Transparent Microcontainer for Encapsulated Islet Therapy," J. Diabetes Sci. Tech. 3(2): 1-7 (Mar. 2009).

Hong et al., "Graphene multilayers as gates for multi-week sequential release of proteins from surfaces," NIH-PA Author Manuscript PMC (Jun. 1, 2014), also published in ACS Nano, Jan. 24, 2012; 6(1): 81-88 (first published online Dec. 29, 2011).

Hu et al., "Enabling graphene oxide nanosheets as water separation membranes," Environmental Science & Technology 47(8): 3715-3723 (Mar. 14, 2013).

International Search Report and Written Opinion in PCT/US2015/013599 mailed Jul. 20, 2015.

International Search Report and Written Opinion in PCT/US2015/013805 mailed Apr. 30, 2015.

International Search Report and Written Opinion in PCT/US2015/018114 mailed Jun. 3, 2015.

International Search Report and Written Opinion in PCT/US2015/020246 mailed Jun. 10, 2015.

International Search Report and Written Opinion in PCT/US2015/020296 mailed Jun. 17, 2015.

International Search Report and Written Opinion in PCT/US2015/028948 mailed Jul. 16, 2015.

International Search Report and Written Opinion in PCT/US2015/029932 mailed Oct. 6, 2015.

(56) References Cited

OTHER PUBLICATIONS

International Search Report and Written Opinion in PCT/US2016/027607 mailed Jul. 22, 2016.
International Search Report and Written Opinion in PCT/US2016/027616 mailed Jul. 22, 2016.
International Search Report and Written Opinion in PCT/US2016/027596 mailed Jul. 22, 2016.
International Search Report and Written Opinion in PCT/US2016/027603 mailed Jul. 22, 2016.
International Search Report and Written Opinion in PCT/US2016/027610 mailed Jul. 22, 2016.
International Search Report and Written Opinion in PCT/US2016/027612 mailed Jul. 22, 2016.
International Search Report and Written Opinion in PCT/US2016/027637 mailed Jun. 22, 2016.
International Search Report in PCT/US15/20201 mailed Jun. 10, 2015.
International Search Report in PCT/US2015/048205 mailed Dec. 4, 2015.
Inui et al., "Molecular dynamics simulations of nanopore processing in a graphene sheet by using gas cluster ion beam," Appl. Phys. A, 98: 787-794 (Mar. 2010) (available online Dec. 2009).
Jiang et al., "Porous Graphene as the Ultimate Membrane for Gas Separation," Nano Letters 9(12): 4019-4024 (Sep. 23, 2009).
Joshi et al., "Precise and ultrafast molecular sieving through graphene oxide membranes", Science 343(6172): 752-754 (Feb. 14, 2014).
Kanani et al., "Permeability—Selectivity Analysis for Ultrafiltration: Effect of Pore Geometry," NIH-PA Author Manuscript, PMC, (Mar. 1, 2011), also published in J. Memb. Sci. 349(1-2): 405 (Mar. 1, 2010).
Karan et al., "Ultrafast Viscous Permeation of Organic Solvents Through Diamond-Like Carbon Nanosheets," Science 335: 444-447 (Jan. 27, 2012).
Kim et al., "Fabrication and Characterization of Large Area, Semiconducting Nanoperforated Graphene Materials," Nano Letters 10(4): 1125-1131 (Mar. 1, 2010).
Kim et al., "The structural and electrical evolution of graphene by oxygen plasma-induced disorder," Nanotechnology IOP 20(375703): 1-8 (Aug. 26, 2009).
Koh et al., "Sensitive NMR Sensors Detect Antibodies to Influenza," NIH PA Author Manuscript PMC (Apr. 2009), also published in Angew. Chem. Int'l. Ed. Engl, 47(22): 4119-4121 (May 2008) (available online Apr. 2008).
Koski and Cui, "The New Skinny in Two-Dimensional Nanomaterials", ACS Nano 7(5): 3739-3743 (May 16, 2013).
Kurapati et al., "Graphene oxide based multilayer capsules with unique permeability properties: facile encapsulation of multiple drugs," Chemical Communication 48: 6013-6015 (Apr. 25, 2012).
Lehtinen et al., "Cutting and controlled modification of graphene with ion beams," Nanotechnology, 22: 175306 (8 pages) (Mar. 2011).
Li et al., "3D graphene oxide-polymer hydrogel: near-infrared light-triggered active scaffold for reversible cell capture and on-demand release," Advanced Materials 25: 6737-6743 (Oct. 7, 2013).
Liu et al., "Atomically Thin Molybdenum Disulfide Nanopores with High Sensitivity for DNA Translocation," ACS Nano 8(3): 2504-2511 (Feb. 18, 2014).
Liu et al., "Graphene Oxidation: Thickness-Dependent Etching and Strong Chemical Doping," Nano Letters 8(7): 1965-1970 (Jun. 19, 2008).
Marquardt et al., "Hybrid materials of platinum nanoparticles and thiol-functionalized graphene derivatives," Carbon 66: 285-294 (Jan. 2014; first published online Sep. 12, 2013).
Matteucci et al., "Chapter 1: Transport of gases and Vapors in Glass and Rubbery Polymers," in Materials Science of Membranes for Gas and Vapor Separation (Yampolskii et al eds. 2006) (available online Jun. 2006).
Mishra et al., "Functionalized Graphene Sheets for Arsenic Removal and Desalination of Sea Water," Desalination 282: 39-45 (Nov. 1, 2011).
Morse, "Scalable Synthesis of Semiconducting Nanopatterned Graphene Materials," InterNano Resources for Nanomanufacturing (undated). Retrieved Jun. 2, 2016 from: http://www.internano.org/node/345.
Nair et al., "Unimpeded Permeation of Water Through Helium-Leak-tight Graphene-Based Membranes," Science 335: 442-444 (Jan. 27, 2012).
Nam et al., "Monodispersed PtCo nanoparticles on hexadecyltrimethylammonium bromide treated graphene as an effective oxygen reduction reaction catalyst for proton exchange membrane fuel cells," Carbon 50: 3739-3747 (Aug. 2012) (available online Apr. 2012).
Nandamuri et al., "Chemical vapor deposition of graphene films," Nanotechnology 21(14): 1-4 (Mar. 10, 2010).
Nayini et al., "Synthesis and characterization of functionalized carbon nanotubes with different wetting behaviors and their influence on the wetting properties of carbon nanotubes/polymethylmethacrylate coatings," Progress in Organic Coatings, 77(6): 1007-1014 (Jun. 2014) (available online Mar. 2014).
O'Hern et al. "Selective Molecular Transport through Intrinsic Defects in a Single Layer of CVD Graphene," ACS Nano, 6(11): 10130-10138 (Oct. 2, 2012).
O'Hern et al., "Selective Ionic Transport through Tunable Subnanometer Pores in Single-Layer Graphene Membranes," Nano Letters 14(3): 1234-1241 (Feb. 3, 2014).
O'Hern, "Development of process to transfer large areas of LPCVD graphene from copper foil to a porous support substrate," 1-62 (M.S. Thesis, Massachusetts Institute of Technology) (Sep. 2011).
Paul, "Creating New Types of Carbon-Based Membranes," Science 335: 413-414 (Jan. 27, 2012).
Plant et al., "Size-dependent propagation of Au nanoclusters through few-layer graphene," Nanoscale, 6: 1258-1263 (2014) (available online Oct. 2013).
Popok. "Cluster Ion Implantation in Graphite and Diamond: Radiation Damage and Stopping of Cluster Constituents," Reviews on Advanced Materials Science 38(1): 7-16 (2014).
Russo et al., "Atom-by-atom nucleation and growth of graphene nanopores," PNAS, 109(16): 5953-5957 (Apr. 2012).
Schweicher et al., "Membranes to achieve immunoprotection of transplanted islets," NIH-PA Author Manuscript, PMC, (Nov. 13, 2014), also published in Frontiers in Bioscience (Landmark Ed) 19: 49-76 (Jan. 1, 2014).
Sint et al., "Selective Ion Passage through Functionalized Graphene Nanopores," JACS 130: 16448-16449 (Nov. 14, 2008).
Suk et al., "Water Transport Through Ultrathin Graphene," Journal of Physical Chemistry Letters 1(10): 1590-1594 (Apr. 30, 2010).
Sun et al., "Growth of graphene from solid carbon sources," Nature 468(7323): 549-552 (Nov. 25, 2010; including corrigendum in Nature 471(7336): 124 (Mar. 2011).
Tan et al., "Beta-cell regeneration and differentiation: how close are we to the 'holy grail'?" J. Mol. Encodrinol. 53(3): R119-R129 (Dec. 1, 2014).
Tang et al., "Highly wrinkled cross-linked graphene oxide membranes for biological and charge-storage applications," Small 8(3): 423-431 (Feb. 6, 2012; first published online Dec. 13, 2011).
Vlassiouk et al., "Versatile ultrathin nanoporous silicon nitride membranes," Proc. Natl. Acad. Sci. USA 106(50): 21039-21044 (Dec. 15, 2009).
Wadvalla, "Boosting agriculture through seawater," Nature Middle East (Jul. 2, 2012). Retrieved Jun. 1, 2016 from: natureasia.com/en/nmiddleeast/article/10.1038/nmiddleeast.2012.92?WT.mc_id=FBK NatureMEast].
Wikipedia, "Ion track." Jun. 1, 2016. Retrieved Jun. 1, 2016 from: en.wikipedia.org/wiki/ion_track.
Xu et al., "Graphene-like Two-Dimensional Materials", Chemical Reviews 113: 3766-3798 (Jan. 3, 2013).
Zabihi et al., "Formation of nanopore in a suspended graphene sheet with argon cluster bombardment: A molecular dynamics simulation study," Nuclear Instruments and Methods in Physics Research B, 343: 48-51 (Jan. 2015) (available online Nov. 2014).

(56) References Cited

OTHER PUBLICATIONS

Zan et al., "Graphene Reknits Its Holes," Nano Lett. 12(8): 3936-3940 (Jul. 5, 2012).
Zhao et al. "Two-Dimensional Material Membranes: An Emerging Platform for Controllable Mass Transport Applications," Small 10(22): 4521-4542 (Sep. 10, 2014).
Zhao et al., "Drilling Nanopores in Graphene with Clusters: A Molecular Dynamics Study," J. Phys. Chem. C, 116(21): 11776-1178 (2012) (available online May 2012).
Zhao et al., "Effect of SiO2 substrate on the irradiation-assisted manipulation of supported graphene: a molecular dynamics study," Nanotechnology, 23(28):1-8 (Jul. 2012) (available online Jun. 2012).
CN Office Action in Chinese Application No. 201380013988.9 mailed Aug. 18, 2016 (English translation not readily available).
Cohen-Tanugi, "Nanoporous graphene as a water desalination membrane," (Ph.D. Thesis, Massachusetts Institute of Technology) (Jun. 2015).
US Notice of Allowance in U.S. Appl. No. 14/610,770 mailed Aug. 12, 2016.
US Office Action in U.S. Appl. No. 14/656,190 mailed Aug. 29, 2016.
US Office Action for U.S. Appl. No. 14/656,580 dated Jun. 2, 2016.
US Office Action in U.S. Appl. No. 14/819,273 mailed Jul. 6, 2016.
US Office Action for U.S. Appl. No. 14/856,198 dated Jun. 3, 2016.
Yoon, "Simulations show how to turn graphene's defects into assets," ScienceDaily (Oct. 4, 2016), www.sciencedaily.com/releases/2016/10/161004120428.htm.
Zhang et al. Modern Thin-Film Technology 284-285 (Metallurgical Industry Press, 1st ed. 2009) (English translation not readily available).
Notice of Allowance for U.S. Appl. No. 14/819,273 dated Oct. 28, 2016.
US Office Action for U.S. Appl. No. 14/193,007 dated Oct. 21, 2016.
US Office Action for U.S. Appl. No. 14/193,007 dated Dec. 21, 2015.
US Office Action for U.S. Appl. No. 14/193,007 dated Jul. 1, 2016.
Barreiro et al. "Understanding the catalyst-free transformation of amorphous carbon into graphene by current-induced annealing," Scientific Reports, 3 (Article 1115): 1-6 (Jan. 2013).
Botari et al., "Graphene healing mechanisms: A theoretical investigation," Carbon, 99: 302-309 (Apr. 2016) (published online Dec. 2015).
Chen et al., "Defect Scattering in Graphene," Physical Review Letters, 102: 236805-1-236805-4 (Jun. 2009).
Chen et al., "Self-healing of defected graphene," Applied Physics Letters, 102(10): 103107-1-103107-5 (Mar. 2013).
Cheng et al., "Ion Transport in Complex Layered Graphene-Based Membranes with Tuneable Interlayer Spacing," Science Advances, 2(2): e1501272 (9 pages) (Feb. 2016).
Crock et al., "Polymer Nanocomposites with Graphene-Based Hierarchical Fillers as Materials for Multifunctional Water Treatment Membranes," Water Research, 47(12): 3984-3996 (Aug. 2013) (published online Mar. 2013).
Han et al., "Ultrathin Graphene Nanofiltration Membrane for Water Purification," Advanced Functional Materials, 23(29): 3693-3700 (Aug. 2013).
International Search Report and Written Opinion in PCT/US2016/027583 mailed Jan. 13, 2017.
Written Opinion in PCT/US2016/027590 mailed Jan. 6, 2017.
International Search Report and Written Opinion in PCT/US2016/027594 mailed Jan. 13, 2017.
International Search Report and Written Opinion in PCT/US2016/027628 mailed Jan. 9, 2017.
International Search Report and Written Opinion in PCT/US2016/027631 mailed Jan. 13, 2017.
International Search Report and Written Opinion in PCT/US2016/027632 mailed Jan. 9, 2017.
Written Opinion in PCT/US2016/052010 mailed Dec. 20, 2016.
International Search Report in PCT/US2016/027629 mailed Dec. 8, 2016.
International Search Report in PCT/US2016/052007 mailed Dec. 27, 2016.
Kjeldsen, T., "Yeast secretory expression of insulin precursors," Appl Microbiol Biotechnol, 54: 277-286 (May 2000).
Lin et al., "A Direct and Polymer-Free Method for Transferring Graphene Grown by Chemical Vapor Deposition to Any Substrate," ACSNANO, 8(2): 1784-1791 (Jan. 2014).
Liu et al. "Synthesis of high-quality monolayer and bilayer graphene on copper using chemical vapor deposition," Carbon, 49(13): 4122-4130 (Nov. 2011) (published online May 2011).
O'Hern et al., "Nanofiltration across defect-sealed nanoporous monolayer graphene," Nano Letters, 15(5): 3254-3260 (Apr. 2015).
US Corrected Notice of Allowance in U.S. Appl. No. 13/480,569 mailed May 26, 2015.
US Notice of Allowance for U.S. Appl. No. 14/610,770 dated Apr. 25, 2016.
US Notice of Allowance in U.S. Appl. No. 14/819,273 mailed Dec. 14, 2016.
US Notice of Allowance in U.S. Appl. No. 13/480,569 mailed Feb. 27, 2015.
US Office Action in U.S. Appl. No. 13/480,569 mailed Jul. 30, 2014.
US Office Action in U.S. Appl. No. 14/856,471 mailed Dec. 1, 2016.
US Restriction Requirement in U.S. Appl. No. 14/193,007 mailed Jul. 17, 2015.
Wang et al., "Graphene Oxide Membranes with Tunable Permeability due to Embedded Carbon Dots," Chemical Communications, 50(86): 13089-13092 (Nov. 2014) (published online Sep. 2014).
Xu et al., "Graphene Oxide-$TiO_2$ Composite Filtration Membranes and their Potential Application for Water Purification," Carbon, 62: 465-471 (Oct. 2013) (published online Jun. 2013).
Zhao et al., "A glucose-responsive controlled release of insulin system based on enzyme multilayers-coated mesoporous silica particles," Chem. Commun., 47: 9459-9461 (Jun. 2011).
U.S. Appl. No. 14/193,007, filed Feb. 28, 2014.
U.S. Appl. No. 14/856,471, filed Sep. 16, 2015.
U.S. Appl. No. 15/099,295, filed Apr. 14, 2016.
U.S. Appl. No. 15/099,410, filed Apr. 14, 2016.
U.S. Appl. No. 15/099,420, filed Apr. 14, 2016.
U.S. Appl. No. 15/099,289, filed Apr. 14, 2016.
U.S. Appl. No. 15/099,447, filed Apr. 14, 2016.
U.S. Appl. No. 15/099,269, filed Apr. 14, 2016.
U.S. Appl. No. 15/099,239, filed Apr. 14, 2016.
U.S. Appl. No. 15/099,464, filed Apr. 14, 2016.
U.S. Appl. No. 15/099,276, filed Apr. 14, 2016.
U.S. Appl. No. 15/099,482, filed Apr. 14, 2016.
U.S. Appl. No. 15/099,056, filed Apr. 14, 2016.
U.S. Appl. No. 15/099,099, filed Apr. 14, 2016.
U.S. Appl. No. 14/656,190, filed Mar. 12, 2015.
U.S. Appl. No. 15/099,304, filed Apr. 14, 2016.
U.S. Appl. No. 15/099,588, filed Apr. 14, 2016.
U.S. Appl. No. 14/707,808, filed May 8, 2015.
U.S. Appl. No. 14/819,273, filed Aug. 5, 2015.
U.S. Appl. No. 14/856,198, filed Sep. 16, 2015.
U.S. Appl. No. 14/754,531, filed Jun. 29, 2015.
U.S. Appl. No. 14/610,770, filed Jan. 30, 2015.
U.S. Appl. No. 14/656,657, filed Mar. 12, 2015.
U.S. Appl. No. 14/609,325, filed Jan. 29, 2015.
U.S. Appl. No. 14/656,580, filed Mar. 12, 2015.
U.S. Appl. No. 13/480,569, filed May 25, 2012.
PCT/US2015/028948, filed May 1, 2015.
PCT/US2015/018114, filed Feb. 27, 2015.
U.S. Appl. No. 14/843,944, filed Sep. 2, 2015.
U.S. Appl. No. 15/099,193, filed Apr. 14, 2016.
U.S. Appl. No. 15/308,351, filed Nov. 1, 2016.
US Notice of Allowance in U.S. Appl. No. 14/610,770, mailed Jan. 23, 2017.
US Office Action for U.S. Appl. No. 14/656,580, dated Feb. 9, 2017.

* cited by examiner

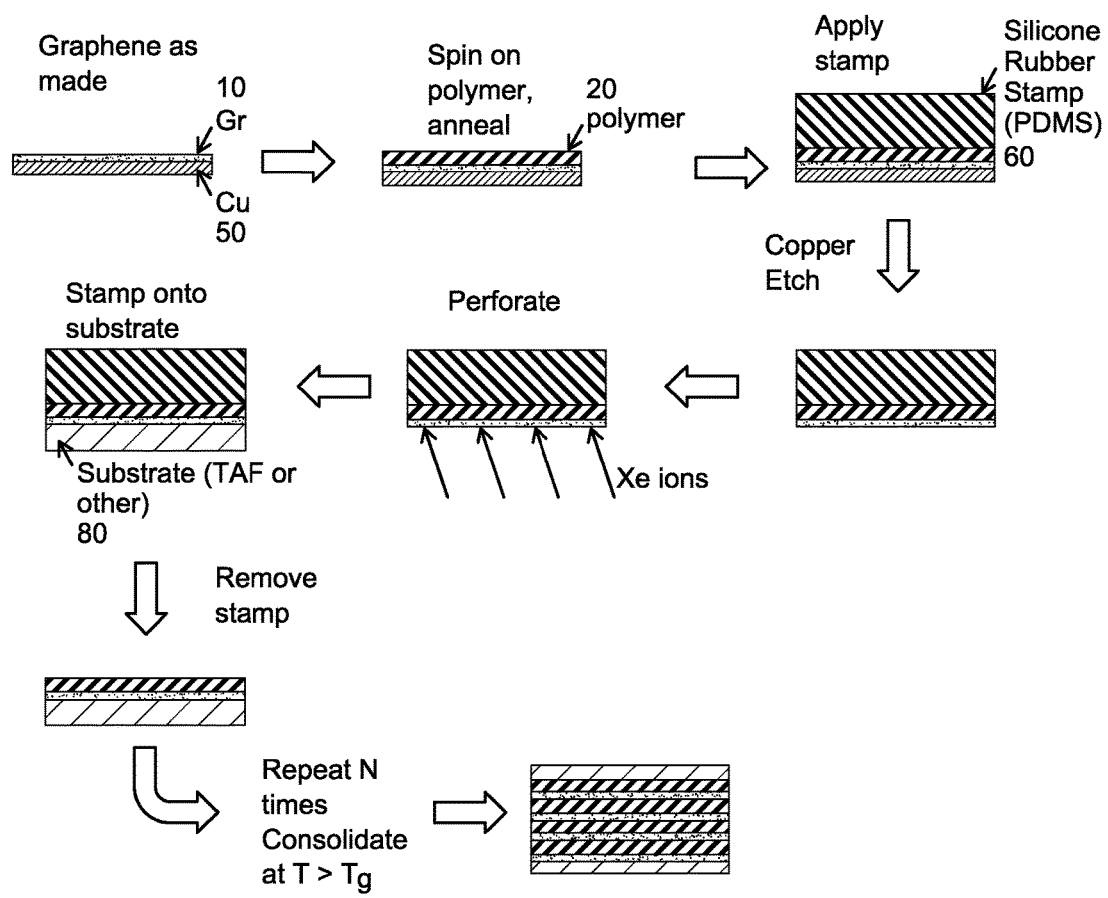

SEPARATION MEMBRANES FORMED FROM PERFORATED GRAPHENE AND METHODS FOR USE THEREOF

CROSS-REFERENCE TO RELATED APPLICATIONS

This application is a continuation-in-part of U.S. patent application Ser. No. 14/656,580, filed Mar. 12, 2015, which claims the benefit of priority under 35 U.S.C. §119 of U.S. Provisional Application 61/951,930, filed Mar. 12, 2014, each of which is hereby incorporated by reference in its entirety.

STATEMENT REGARDING FEDERALLY SPONSORED RESEARCH OR DEVELOPMENT

Not applicable.

FIELD

The present disclosure generally relates to separation processes, and, more specifically, to separation membranes containing graphene or other two dimensional materials and methods for use and fabrication thereof.

BACKGROUND

Gas species separation from mixtures represents an important industrial and economic process. In the natural gas production industry, for example, almost all raw (as-produced) natural gas is processed to remove various contaminants and non-valued gases before downstream utilization, such as introducing it as a product into a pipeline transportation system. For example, co-produced gases such as carbon dioxide and hydrogen disulfide, especially in combination with water, can heavily impact the value of as-produced natural gas. Production of unconventional gas sources such as shale plays and coal beds is increasing and driving a need for more efficient and affordable processing systems at more remote sites and with higher contaminant gas level processing capabilities. Contaminants in other types of gases can also be problematic and can impact their valuation, as well as the applicability of various industrial processes. For example, $CO_2$ and contaminant capture from industrial flue gas, hydrogen purification and recovery processes, syngas production, and fuel cells represent non-limiting areas that can benefit from gas separation technology.

Separation membranes are commonly used for gas separation processes in a variety of industrial settings, including speciation of natural gas. Gas separation membranes are attractive for use in gas phase separation processes because they generally possess no or few moving parts, require low maintenance, exhibit low energy consumption, and possess exceptional reliability. However, many conventional membranes are not highly efficient, can be chemically unstable in certain instances and do not compete well with bulk non-membrane separation processes. For example, illustrative bulk carbon dioxide separation technologies can include cryogenic separation, pressure-temperature adsorption cycles, $CO_2$ capture with amines, and the like. $CO_2$ separation membranes, in contrast, can operate well at high $CO_2$ concentrations, but can be less effective at modest $H_2S$ concentrations. Nevertheless, with proper process design, membrane-based gas separation processes can be used to simplify overall process design and be more convenient for deployment in remote field locations.

Specialized polymer membranes have been developed for use in specific gas separation applications. Examples include cellulose acetate membranes for $CO_2$ separations in "sour gas" conditions, polyimide membranes, and polyamide membranes. Many different polymers are used in this regard, as different polymers have utility and affinity for use with different gas species, allowing certain gases to transit the membrane in preference to others. The transit mechanism can depend on specific interactions between gas and polymer molecules that affect gas dissolution and diffusion through the polymer. The polymer is generally chosen to enhance these interactions for the target gases and enhance the permeation rate of a desired gas over the permeation rate of an undesired gas, or vice versa. Generally, a membrane is considered to give an adequate separation of two gases from one another if the permeation ratio of the two gases is about 10:1 or above, although other permeation ratios can also be adequate depending on the intended application in which the gas will be used. Although widely used, existing polymer membranes can display inadequate performance for certain gas mixtures or not be applicable to certain types of process conditions. For example, chemical stability of the polymer membrane under certain process conditions can represent a concern.

A variety of other materials have also been developed for use in gas separation. Mesoporous and nanoporous inorganic materials that exhibit selective permeability of gas species include ceramic materials, nanoporous silicon, nanoporous metals, zeolite materials and zeolite-type materials. Materials such as zeolites and zeolite-type materials are molecular sieves which are capable of acting as sieves on a molecular scale and are characterized by uniformly sized pores of molecular dimension that can adsorb small molecules. Nonporous thin layers of metal can also exhibit selective adsorption and transport of gas or gases. For example, a thin platinum layer can absorb and transport hydrogen. Nanoporous carbon membranes and metal organic framework materials also can provide selective transport of gas species. In some cases, a membrane of these materials may be provided as composite membrane including a selective layer supported on a porous support. For example, zeolite or zeolite-type membranes may include a selective zeolite or zeolite-type membrane layer supported on a porous inorganic support (e.g. metal or ceramic).

In view of the foregoing, improved techniques for gas separation, particularly using membrane technology, would be of considerable benefit in the art. The present disclosure satisfies this need and provides related advantages as well.

SUMMARY

The present disclosure describes separation membranes containing at least one layer of a perforated two-dimensional material and at least one layer of a membrane material other than a two-dimensional material. In embodiments, the two-dimensional material is graphene, multilayer graphene, multiple layers of single layer or multilayer graphene or single or multiple layers of a graphene-based material. Methods for preparing the separation membranes can include stacking one or more layers of the membrane material and one or more layers of the two-dimensional material upon one another. The two-dimensional material can be perforated before or after being stacked with the layers of the other membrane material. In an embodiment, the at least one layer of the membrane material exhibits a selected permeability for a first elected gas with respect to one or more other gases. In some embodiments, the combination of different layers of material mitigates selectivity loss due to any pinholes, tears or other defects in any individual layer.

In embodiments, membranes provided by the present disclosure allow separation of $CO_2$ from $CH_4$, $N_2$ from $O_2$, $H_2$ from $CO_2$, or $H_2$ from $CH_4$. For example, $CO_2$ may be removed from natural gas to provide natural gas sweetening. As a further example, separation of $N_2$ and $O_2$ allows modification of the ratio of the partial pressure of $O_2$ to the partial pressure of $N_2$ in air.

In embodiments, the membrane material is selected from non-porous or dense polymer, mesoporous or nanoporous ceramic materials, mesoporous or nanoporous silicon, zeolites, zeolite-like or zeolite-type materials, metal organic framework materials, nanoporous or nonporous metals, and nanoporous carbon and combinations thereof. In specific embodiments, the at least one layer of polymer exhibits permeance to one or more gases via one or more solution diffusion processes. Mesoporous or nanoporous ceramic materials include, but are not limited to, metal oxide ceramics, oxycarbide ceramics and carbonitride ceramic such as aluminum oxides (e.g. alumina), silicon oxides (e.g. silica) and silicon oxycarbides (e.g. SiOC) and silicon carbonitride (SiCN). Zeolite-type materials include, but are not limited to, high silica zeolites, aluminophosphates, silicoaluminophosphates and other analogs of zeolite-like structures. In a further embodiment, the membrane is a molecular sieve membrane. Molecular sieve membranes include zeolite membranes, membranes of zeolite-type material, metal oxide membranes, active carbon membranes and metal organic framework membranes. In some embodiments, the membrane layer is a non-polymeric molecular sieve membrane. In different embodiments the membrane may be porous or have not through porosity.

In some embodiments, a non-polymeric membrane layer is combined with a polymeric layer. By using a combination of polymer layers and non-polymeric membrane layers to augment transport selectivity in a multi-layered composite membrane as described herein, the membrane designer may have more options for choice of polymer layers. For example, if the gas permeability contrast of the non-polymeric molecular sieve layer(s) is (are) sufficiently high, the polymer layers can be chosen to meet requirements other than high transport selectivity. For example, the polymer layer can be chosen to provide high chemical resistance or mechanical strength instead of permeability selectivity. This enables more membrane design flexibility Methods for preparing the separation membranes can include stacking one or more layers of the membrane material and one or more layers of the two-dimensional material upon one another. The two-dimensional material can be perforated before or after being stacked with the polymer layers. In specific embodiments, the two-dimensional material is a graphene-based material such as a graphene-based sheet. In an embodiment, the at least one layer of membrane material exhibits a selected permeability for a first elected gas with respect to one or more other gases.

In certain embodiments, the present disclosure describes separation membranes containing at least one layer of a polymer and at least one layer of a perforated two-dimensional material, particularly perforated graphene. Methods for preparing the separation membranes can include stacking one or more layers of polymer and one or more layers of the two-dimensional material upon one another. The two-dimensional material can be perforated before or after being stacked with the polymer layers. In specific embodiments, the two-dimensional material is a graphene-based material such as a graphene-based sheet. In an embodiment, the at least one layer of polymer exhibits a selected permeability for a first elected gas with respect to one or more other gases. In specific embodiments, the at least one layer of polymer is non-porous or dense. In specific embodiments, the at least one layer of polymer exhibits permeance to one or more gases via one or more solution diffusion processes.

Separation processes using the separation membranes described herein can be accomplished by contacting a gas mixture with the separation membrane and applying a driving force to cause transport of at least one of the gases across the membrane. In an embodiment, the gas mixture comprises a first and a second gas. By perforating the two-dimensional material, such as graphene, with perforations or apertures that are of a sufficient size to allow increased transit of a desired gas through the membrane over that of one or more undesired gases, or vice versa, separation of the gas mixture can take place. Separation of two or more species in a mixture includes at least a change in the ratio(s) (weight or molar ratio) of the two or more species in the gas mixture after passage of the mixture through a perforated two-dimensional material or through the composite separation membranes herein. It will be appreciated that separation of a desired gas component from an undesired component can be achieved by retarding passage of the undesired species with respect to the desired species or by retarding passage of the desired species with respect to the undesired species. Separation processes herein may include multiple passages of a given gas mixture through a given separation membrane or passage of a gas mixture through multiple separation membranes. In embodiments, the driving force for gas transport is a difference in pressure between the inlet (feed) and outlet (permeate) sides of the membrane, a difference in concentration between the inlet and outlet sides of the membrane or a combination thereof. In an embodiment, the difference in concentration is created and maintained by application of a sweep gas on the permeate side of the membrane that keeps the concentration of the preferred permeating gas low on this side of the membrane.

In an aspect, the invention provides separation membranes comprising at least one dense polymeric membrane and at least one layer of a perforated two dimensional material. The dense polymer membrane can operate normally by solution-diffusion processes, giving some initial separation of gas species. The filter of perforated two dimensional material (i.e., perforated graphene layers) can block or limit passage of molecules larger than the holes in the two dimensional material, while at the same time permitting passage of smaller molecules. In embodiments, the pore size is selected to close to or slightly smaller than the kinetic radius of the smaller molecule of the gas mixture to separate that molecule from larger molecules. In embodiment where the pores are functionalized, the effective pore size may be affected (e.g. decreased) or transport otherwise affected by the pore functionalization. Thus, the composite membrane can separate gas species by two complementary mechanisms: solution-diffusion at the polymer (i.e., molecule-polymer interaction) and molecule size sieving. In this regard, the two-dimensional sieve barrier can provide very high permeability contrast at a threshold molecular size, allowing high separation ratios based upon size to be realized (e.g., $CO_2$ compared to methane). If the hole-size density in the graphene layer is sufficiently high, the graphene layer can convey very little added resistance to permeation of small molecules. Accordingly, the higher selectivity provided by the graphene layer can allow for a much thinner polymer membrane to be used, compared to solely polymer-containing membranes.

The disclosure provides a composite membrane for separation of a first gas from a second gas; said separation membrane comprising: at least one membrane permeable to said first gas and at least one layer of a perforated two-dimensional material wherein said composite membrane is arranged to provide preferential transport of said first gas relative to said second gas through said at least one membrane and said at least one layer of said perforated two-dimensional material. In embodiments, at least one of or each of the membranes is independently characterized by a permeability to said first gas greater than or equal to 1 Barrer ($7.5\times10^{-11}$ $cm^3$ $cm^{-1}$ $s^{-1}$ $kPa^{-1}$), 10 Barrer ($7.5\times10^{-10}$ $cm^3$ $cm^{-1}$ $s^{-1}$ $kPa^{-1}$) or 100 Barrer ($7.5\times10^{-9}$ $cm^3$ $cm^{-1}$ $s^{-1}$ $kPa^{-1}$). In embodiments, at least one of or each of the membranes is independently characterized by a permeability for said first gas is independent from 1 Barrer to 100,000 Barrer, from 10 Barrer to 100,000 Barrer or from 100 Barrer to 100,000 Barrer. In embodiments, the composite membrane is characterized by a net or overall permeability to said first gas greater than or equal to 1 Barrer ($7.5\times10^{-11}$ $cm^3$ $cm^{-1}$ $s^{-1}$ $kPa^{-1}$), 10 Barrer ($7.5\times10^{-10}$ $cm^3$ $cm^{-1}$ $s^{-1}$ $kPa^{-1}$) or 100 Barrer ($7.5\times10^{-9}$ $cm^3$ $cm^{-1}$ $s^{-1}$ $kPa^{-1}$). In embodiments, the net permeability of the composite membrane to said first gas is from 1 Barrer to 100,000 Barrer, from 10 Barrer to 100,000 Barrer or from 100 Barrer to 100,000 Barrer.

The disclosure provides a composite membrane for separation of a first gas from a second gas; said separation membrane comprising: at least one dense polymeric membrane permeable to said first gas and at least one layer of a perforated two-dimensional material wherein said composite membrane is arranged to provide preferential transport of said first gas relative to said second gas through said at least one dense polymer membrane and said at least one layer of said perforated two-dimensional material. In embodiments, at least one of or each of the dense polymeric membranes is independently characterized by a permeability to said first gas greater than or equal to 1 Barrer ($7.5\times10^{-11}$ $cm^3$ $cm^{-1}$ $s^{-1}$ $kPa^{-1}$), 10 Barrer ($7.5\times10^{-10}$ $cm^3$ $cm^{-1}$ $s^{-1}$ $kPa^{-1}$) or 100 Barrer ($7.5\times10^{-9}$ $cm^3$ $cm^{-1}$ $s^{-1}$ $kPa^{-1}$). In embodiments, at least one of or each of the dense polymeric membranes is independently characterized by a permeability for said first gas is independent from 1 Barrer to 100,000 Barrer, from 10 Barrer to 100,000 Barrer or from 100 Barrer to 100,000 Barrer. In embodiments, the composite membrane is characterized by a net or overall permeability to said first gas greater than or equal to 1 Barrer ($7.5\times10^{-11}$ $cm^3$ $cm^{-1}$ $s^{-1}$ $kPa^{-1}$), 10 Barrer ($7.5\times10^{-10}$ $cm^3$ $cm^{-1}$ $s^{-1}$ $kPa^{-1}$) or 100 Barrer ($7.5\times10^{-9}$ $cm^3$ $cm^{-1}$ $s^{-1}$ $kPa^{-1}$). In embodiments, the net permeability of the composite membrane to said first gas is from 1 Barrer to 100,000 Barrer, from 10 Barrer to 100,000 Barrer or from 100 Barrer to 100,000 Barrer.

The separation selectivity or efficiency of the composite membrane may be taken as the ratio of the net permeability of the composite membrane to the first gas to the net permeability of the composite membrane to the second gas. In embodiments, the net separation selectivity of the composite membrane is greater than 10, greater than 2, greater than 50 or greater than 100.

In an aspect, the disclosure provides a composite membrane comprising at least one membrane and at least one layer of said perforated two-dimensional material, wherein the at least one membrane and at least one layer of said perforated two-dimensional material are provided in physical contact with each other or separated by one or more intermediate structures provided in physical contact with said at least one membrane and said at least one layer of said perforated two-dimensional material. In an embodiment, said at least one membrane and said at least one layer of said perforated two-dimensional material are provided in a stacked multilayer geometry. In embodiments, said stacked multilayer geometry comprises 1 to 100 layers of membrane material and 1 to 100 layers of said perforated two-dimensional material, 1 to 50 layers of said membrane material and 1 to 50 layers of said perforated two-dimensional material, 1 to 25 layers of said membrane material and 1 to 25 layers of said perforated two-dimensional material, 1 to 10 layers of said membrane material and 1 to 10 layers of said perforated two-dimensional material or 1 to 5 layers of membrane material and 1 to 5 layers of said perforated two-dimensional material. In an embodiment, said stacked multilayer geometry comprises at least one membrane positioned on an external surface of said composite membrane in physical contact with said first gas and said second gas. In an embodiment, each of said layers of said perforated two-dimensional material provided in said stacked multilayer geometry is independently positioned between first and second adjacent membranes. In an embodiment, said stacked multilayer geometry comprises a first membrane in physical contact with a first layer of said perforated two-dimensional material. In an embodiment, said stacked multilayer geometry further comprises a second membrane wherein said first layer of said perforated two-dimensional material is provided between, and in physical contact with, said first and second membranes. In an embodiment, said stacked multilayer geometry comprises a plurality of said membranes, wherein at least a portion of said membranes have a different chemical compositions, thicknesses or both. In embodiments, said stacked multilayer geometry comprises a plurality of said layers of said perforated two-dimensional material, wherein at least a portion of said layers of said perforated two-dimensional material have a different chemical compositions, hole cross sectional dimensions, hole densities or any combination of these. In further embodiments, the stacked multilayer comprises at least two adjacent layers of two-dimensional material.

In an aspect, the disclosure provides a composite membrane comprising at least one dense polymeric membrane and at least one layer of said perforated two-dimensional material, wherein the at least one dense polymeric membrane and at least one layer of said perforated two-dimensional material are provided in physical contact with each other or separated by one or more intermediate structures provided in physical contact with said at least one dense polymeric membrane and said at least one layer of said perforated two-dimensional material. In an embodiment, said at least one dense polymeric membrane and said at least one layer of said perforated two-dimensional material are provided in a stacked multilayer geometry. In embodiments, said stacked multilayer geometry comprises 1 to 100 layers of dense polymeric membrane and 1 to 100 layers of said perforated two-dimensional material, 1 to 50 layers of said dense polymeric membrane and 1 to 50 layers of said perforated two-dimensional material, 1 to 25 layers of said dense polymeric membrane and 1 to 25 layers of said perforated two-dimensional material, 1 to 10 layers of said dense polymeric membrane and 1 to 10 layers of said perforated two-dimensional material or 1 to 5 layers of dense polymeric membrane and 1 to 5 layers of said perforated two-dimensional material. In an embodiment, said stacked multilayer geometry comprises at least one dense polymeric membrane positioned on an external surface of said composite membrane in physical contact with said first gas and said second gas. In an embodiment, each of said layers of said perforated two-dimensional material provided in said stacked multilayer geometry is independently positioned between first and second adjacent dense polymeric membranes. In an embodiment, said stacked multilayer geometry comprises a first dense polymeric membrane in physical contact with a first layer of said perforated two-dimensional material. In an embodiment, said stacked multilayer geometry further comprises a second dense polymeric membrane wherein said first layer of said perforated two-dimensional material is provided between, and in physical contact with, said first and second dense polymeric membranes. In an embodiment, said stacked multilayer geometry comprises a plurality of said dense polymeric membranes, wherein at least a portion of said dense polymeric membranes have a different chemical compositions, thicknesses or both. In embodiments, said stacked multilayer geometry comprises a plurality of said layers of said perforated two-dimensional material, wherein at least a portion of said layers of said perforated two-dimensional material have a different chemical compositions, hole cross sectional dimensions, hole densities or any combination of these. In further embodiments, the stacked multilayer comprises at least two adjacent layers of two-dimensional material. In some embodiments, the stacked multilayer geometry comprises 1 to 2 layers of polymer and 1 to 2 layers of two-dimensional material.

In an embodiment, each of said layers of a perforated two dimensional material independently provides separation of said first and second gases via a molecular sieving process. In an embodiment, each of said layers of perforated two-dimensional material is independently characterized by a ratio of a permeance for said first gas to a permeance for said second gas greater than or equal to 1000. In an embodiment, each of said layers of perforated two-dimensional material is independently characterized by a thickness selected from the range of 0.34 to 5 nm. In an embodiment, each of said layers of perforated two-dimensional material is independently characterized by a tensile strength greater than or equal to 50 MPa. In an embodiment, each of said layers of perforated two-dimensional material is independently characterized by a plurality of holes independently having cross sectional dimensions less than or equal to 15 angstroms, less than or equal to 10 angstroms, or less than or equal to 5 angstroms. In an embodiment, said plurality of holes independently has cross sectional dimensions selected over the range of 3 to 5 angstroms, 3 to 10 angstroms or 3 to 15 angstroms. In an embodiment, the hole area density is 0.1% to 25%.

In an embodiment each of said layers of perforated two dimensional material independently comprises perforated graphene, a perforated graphene-based material, a perforated transition metal dichalcogenide, perforated molybdenum disulfide, perforated α-boron nitride, perforated silicene, perforated germanene, or a combination thereof. In an embodiment, each of said layers of two-dimensional material independently comprises a perforated graphene-based material. In an embodiment, said perforated graphene-based material comprises perforated single-layer graphene, perforated multi-layer graphene, or perforated multiple layers of single layer graphene. In an embodiment, the perforated graphene-based material comprises 2 to 20 layers of graphene. In an embodiment, said perforated graphene-based material comprises at least 70% graphene. In an embodiment, said perforated graphene-based material has a thickness selected from the range of 0.34 to 5 nm.

In an embodiment, the dense polymeric membrane is selected to provide a higher flux, permeance or permeability for one component of a feedstock mixture over another. In an embodiment, each of said dense polymeric membranes independently provides separation of said first gas and second gas via one or more solution diffusion processes. In an embodiment, each of said dense polymeric membranes is independently characterized by a ratio of the permeability for said first gas to the permeability for said second gas greater than or equal to 10. In embodiments, each of the dense polymeric membranes is independently characterized by a porosity less than or equal to 1%, less than or equal to 0.5% or less than or equal to 0.1%. In the absence of manufacturing defects, the porosity in solution diffusion membranes is expected to be significantly less than 1%, being defined by the free volume between polymer chains.

In an embodiment, the dense polymeric membrane contacts the layer of two-dimensional material so that the primary gas transport occurs through the dense polymeric material and layer of two-dimensional material (rather than leakage from the membrane assembly at the interface between the layers). In an embodiment, the dense polymeric membrane is a homogeneous membrane. In embodiments, the thickness of each of the dense polymeric membranes is from less than or equal to 50 µm, from 0.1 µm to 50 µm, from 0.1 µm to 20 µm, 1.0 µm to 15 µm, 0.25 µm to 5 µm, or 5 µm to 10 µm.

In an embodiment, said each of said dense polymeric membranes independently comprises a fluorocarbon, hydrocarbon, polysilicone, polyimide (PI), cellulose acetate (CA), polysulfone (PSf), polyethersulfone (PES), and polycarbonate (PC) or any combination of these. Polysilicone may also be referred to as silicone rubber. In embodiment, the dense polymeric membrane is selected from the group consisting of polyimide or cellulose acetate. In an embodiment, each of said dense polymeric membranes independently comprises a material selected from the group consisting of Teflon® AF, Sylgard® and any combination of these.

In an embodiment, each of said dense polymeric membranes is capable of exposure to a pressure of 50 psi, 100 psi, 500 psi, 1000 psi or 1500 psi or 2000 psi without undergoing mechanical failure when supported by an appropriate porous substrate and/or when in combination with the two-dimensional membranes as described herein. In an embodiment, each of said dense polymeric membranes is independently characterized by a tensile strength greater than or equal to 20 MPa. In embodiments, each of said dense polymeric membranes is capable of exposure to temperatures up to 300 K, 400 K, 500 K or 600 K without undergoing chemical or physical degradation. In embodiment, each said each of said dense polymeric membranes is independently characterized by a glass transition temperature greater than or equal to 300 K, 400 K, 500 K or 600 K. In an embodiment, each of said dense polymeric membranes is resistant to chemical reaction with $H_2O$, $CO_2$, $H_2S$, a hydrocarbon having from 1 to 9 carbon atoms or any combination of these. The hydrocarbon may be an alkane, an alkene, or an alkyne. In an embodiment, the hydrocarbon has the formula $C_nH_{2n+2}$, $C_nH_{2n}$, or $C_nH_{2n-2}$ where n is an integer from 1 to 9.

In an aspect, the disclosure provides a method for separating a first gas from a second gas; said method comprising the steps of:
  providing a composite membrane comprising: at least one dense polymeric membrane permeable to said first gas and at least one layer of a perforated two-dimensional material; and contacting an external surface of said composite membrane with said first gas and said second gas;

and applying a driving force for transport of the first gas across the membrane wherein said composite membrane provides preferential transport of said first gas relative to said second gas through said at least one dense polymer membrane and said at least one layer of perforated two-dimensional material, thereby separating said first gas from said second gas In embodiments, at least one of or each of the dense polymeric membranes is characterized by a permeability to said first gas greater than or equal to 1 Barrer ($7.5\times10^{-11}$ $cm^3$ $cm^{-1}$ $s^{-1}$ $kPa^{-1}$), 10 Barrer ($7.5\times10^{-10}$ $cm^3$ $cm^{-1}$ $s^{-1}$ $kPa^{-1}$) or 100 Barrer ($7.5\times10^{-9}$ $cm^3$ $cm^{-1}$ $s^{-1}$ $kPa^{-1}$). In embodiments, the permeability of at least one of or each of the dense polymeric membranes to said first gas is from 1 Barrer to 100,000 Barrer, from 10 Barrer to 100,000 Barrer or from 100 Barrer to 100,000 Barrer. In embodiments, the composite membrane is characterized by a net or overall permeability to said first gas greater than or equal to 1 Barrer ($7.5\times10^{-11}$ $cm^3$ $cm^{-1}$ $s^{-1}$ $kPa^{-1}$), 10 Barrer ($7.5\times10^{-10}$ $cm^3$ $cm^{-1}$ $s^{-1}$ $kPa^{-1}$) or 100 Barrer ($7.5\times10^{-9}$ $cm^3$ $cm^{-1}$ $s^{-1}$ $kPa^{-1}$). In embodiments, the net permeability of the composite membrane to said first gas is from 1 Barrer to 100,000 Barrer, from 10 Barrer to 100,000 Barrer or from 100 Barrer to 100,000 Barrer.

In an embodiment, the disclosure provides a method of processing a feedstock gas, an exhaust gas, a revitalization gas or a commercial chemical product. In embodiments, the method is a method of processing a product or a byproduct produced in chemical refining or bioenergy production, a method of $N_2$ purification or $CO_2$ purification, a method of capture or sequestering of $CO_2$ or a method of revitalizing air. In an embodiment, said method is carried out a pressure at said external surface selected over the range of 15 PSI to 2000 PSI. In an embodiment, said method is carried out a temperature at said external surface selected over the range of 200 K to 600 K.

In a further embodiment, a method of processing natural gas by separation of methane from non-methane components is provided. In an embodiment, methane is separated from $CO_2$, $H_2O$, $H_2S$ or any combination of these. In an embodiment, methane is said second gas and said first gas is selected from the group consisting of $CO_2$, $H_2O$, H2S or any combination of these. In an embodiment, said processing is carried out at the source of said natural gas. In an embodiment, said natural gas is from a high-$CO_2$ gas field The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIG. 1 shows a schematic of an illustrative graphene-based gas separation membrane of the present disclosure and an exemplary method for its fabrication.

DETAILED DESCRIPTION

A variety of two-dimensional materials useful in the present invention are known in the art. In various embodiments, the two-dimensional material comprises graphene, molybdenum disulfide, or boron nitride. In an embodiment, the two-dimensional material is a graphene-based material. In more particular embodiments, the two-dimensional material is graphene. Graphene according to the embodiments of the present disclosure can include single-layer graphene, multi-layer graphene, or any combination thereof. Other nanomaterials having an extended two-dimensional molecular structure can also constitute the two-dimensional material in the various embodiments of the present disclosure. For example, molybdenum di sulfide is a representative chalcogenide having a two-dimensional molecular structure, and other various chalcogenides can constitute the two-dimensional material in the embodiments of the present disclosure. Choice of a suitable two-dimensional material for a particular application can be determined by a number of factors, including the chemical and physical environment into which the graphene or other two-dimensional material is to be terminally deployed.

In an embodiment, the two dimensional material useful in membranes herein is a sheet of graphene-based material. Graphene-based materials include, but are not limited to, single layer graphene, multilayer graphene or interconnected single or multilayer graphene domains and combinations thereof. In an embodiment, graphene-based materials also include materials which have been formed by stacking single or multilayer graphene sheets. In embodiments, multilayer graphene includes 2 to 20 layers, 2 to 10 layers or 2 to 5 layers. In embodiments, graphene is the dominant material in a graphene-based material. For example, a graphene-based material comprises at least 20% graphene, at least 30% graphene, or at least 40% graphene, or at least 50% graphene, or at least 60% graphene, or at least 70% graphene, or at least 80% graphene, or at least 90% graphene, or at least 95% graphene. In embodiments, a graphene-based material comprises a range of graphene selected from 30% to 95%, or from 40% to 80% from 50% to 70%, from 60% to 95% or from 75% to 100%.

As used herein, a "domain" refers to a region of a material where atoms are uniformly ordered into a crystal lattice. A domain is uniform within its boundaries, but different from a neighboring region. For example, a single crystalline material has a single domain of ordered atoms. In an embodiment, at least some of the graphene domains are nanocrystals, having a domain size from 1 to 100 nm or 10-100 nm. In an embodiment, at least some of the graphene domains have a domain size greater than 100 nm to 1 micron, or from 200 nm to 800 nm, or from 300 nm to 500 nm. "Grain boundaries" formed by crystallographic defects at edges of each domain differentiate between neighboring crystal lattices. In some embodiments, a first crystal lattice may be rotated relative to a second crystal lattice, by rotation about an axis perpendicular to the plane of a sheet, such that the two lattices differ in "crystal lattice orientation".

In an embodiment, the sheet of graphene-based material comprises a sheet of single or multilayer graphene or a combination thereof. In an embodiment, the sheet of graphene-based material is a sheet of single or multilayer graphene or a combination thereof. In another embodiment, the sheet of graphene-based material is a sheet comprising a plurality of interconnected single or multilayer graphene domains. In an embodiment, the interconnected domains are covalently bonded together to form the sheet. When the domains in a sheet differ in crystal lattice orientation, the sheet is polycrystalline.

In embodiments, the thickness of the sheet of graphene-based material is from 0.34 to 10 nm, from 0.34 to 5 nm, or from 0.34 to 3 nm. In an embodiment, a sheet of graphene-based material comprises intrinsic defects. Intrinsic defects are those resulting from preparation of the graphene-based material in contrast to perforations which are selectively introduced into a sheet of graphene-based material or a sheet of graphene. Such intrinsic defects include, but are not limited to, lattice anomalies, pores, tears, cracks or wrinkles. Lattice anomalies can include, but are not limited to, carbon rings with other than 6 members (e.g. 5, 7 or 9 membered rings), vacancies, interstitial defects (including incorporation of non-carbon atoms in the lattice), and grain boundaries.

In an embodiment, membrane comprising the sheet of graphene-based material further comprises non-graphenic carbon-based material located on the surface of the sheet of graphene-based material. In an embodiment, the non-graphenic carbon-based material does not possess long range order and may be classified as amorphous. In embodiments, the non-graphenic carbon-based material further comprises elements other than carbon and/or hydrocarbons. Non-carbon elements which may be incorporated in the non-graphenic carbon include, but are not limited to, hydrogen, oxygen, silicon, copper and iron. In embodiments, the non-graphenic carbon-based material comprises hydrocarbons. In embodiments, carbon is the dominant material in non-graphenic carbon-based material. For example, a non-graphenic carbon-based material comprises at least 30% carbon, or at least 40% carbon, or at least 50% carbon, or at least 60% carbon, or at least 70% carbon, or at least 80% carbon, or at least 90% carbon, or at least 95% carbon. In embodiments, a non-graphenic carbon-based material comprises a range of carbon selected from 30% to 95%, or from 40% to 80%, or from 50% to 70%.

Two-dimensional materials in which pores are intentionally created are referred to herein as "perforated", such as "perforated graphene-based materials", "perforated two-dimensional materials" or "perforated graphene." Two-dimensional materials are, most generally, those which have atomically thin thickness from single-layer sub-nanometer thickness to a few nanometers and which generally have a high surface area. Two-dimensional materials include metal chalogenides (e.g., transition metal dichalogenides), transition metal oxides, hexagonal boron nitride, graphene, silicene and germanene (see: Xu et al. (2013) "Graphene-like Two-Dimensional Materials) Chemical Reviews 113:3766-3798).

Two-dimensional materials include graphene, a graphene-based material, a transition metal dichalcogenide, molybdenum disulfide, α-boron nitride, silicene, germanene, or a combination thereof. Other nanomaterials having an extended two-dimensional, planar molecular structure can also constitute the two-dimensional material in the various embodiments of the present disclosure. For example, molybdenum disulfide is a representative chalcogenide having a two-dimensional molecular structure, and other various chalcogenides can constitute the two-dimensional material in embodiments of the present disclosure. In another example, two-dimensional boron nitride can constitute the two-dimensional material in an embodiment of the invention. Choice of a suitable two-dimensional material for a particular application can be determined by a number of factors, including the chemical and physical environment into which the graphene, graphene-based or other two-dimensional material is to be deployed.

The technique used for forming the two-dimensional material, graphene or graphene-based material in the embodiments described herein is not believed to be particularly limited. For example, in some embodiments CVD graphene or graphene-based material can be used. In various embodiments, the CVD graphene or graphene-based material can be liberated from its growth substrate (e.g., Cu) and transferred to a polymer backing. Likewise, the techniques for introducing perforations to the graphene or graphene-based material are also not believed to be particularly limited, other than being chosen to produce perforations within a desired size range. Perforations are sized to provide desired selective permeability of a species (atom or molecule) for a given gas separation application. Selective permeability relates to the propensity of a porous material or a perforated two-dimensional material to allow passage (or transport) of one or more species more readily or faster than other species. Selective permeability allows separation of species which exhibit different passage or transport rates. In two-dimensional materials selective permeability correlates to the dimension or size (e.g., diameter) of apertures and the relative effective size of the species. Selective permeability of the perforations in two-dimensional materials such as graphene-based materials can also depend on functionalization of perforations (if any) and the specific species that are to be separated. Selective permeability of gases can also depend upon adsorption of a gas species on the filtration material, e.g., graphene. Adsorption at least in part can increase the local concentration of the gas species at the surface of the filtration material enhancing the rate of passage through the apertures. Separation of two or more species in a mixture includes a change in the ratio(s) (weight or molar ratio) of the two or more species in the mixture after passage of the mixture through a perforated two-dimensional material.

For example in applications for separation of gases, permeance is correlated with the size of a gas atom or molecule, for example as in kinetic diameters [see Marreucci et al. (2006) "Transport of gases and Vapors in Glass and Rubbery Polymers" in Materials Science of Membranes for Gas and Vapor Separation. (Eds. Yu et al.) John Wiley & Sons (New York).

The present disclosure is also directed, in part, to perforated graphene, perforated graphene-based materials and other perforated two-dimensional materials containing a plurality of apertures (or holes) ranging from about 3 to 15 angstroms in size. In a further embodiment, the hole size ranges from 3 to 10 angstroms or from 3 to 6 angstroms in size. The present disclosure is further directed, in part, to perforated graphene, perforated graphene-based materials and other perforated two-dimensional materials containing a plurality of holes ranging from about 3 to 15 angstrom in size and having a narrow size distribution, including but not limited to a 1-10% deviation in size or a 1-20% deviation in size. In an embodiment, the characteristic dimension of the holes is from about 3 to 15 angstroms in size. For circular holes, the characteristic dimension is the diameter of the hole. In embodiments relevant to non-circular pores, the characteristic dimension can be taken as the largest distance spanning the hole, the smallest distance spanning the hole, the average of the largest and smallest distance spanning the hole, or an equivalent diameter based on the in-plane area of the pore. As used herein, perforated graphene-based materials include materials in which non-carbon atoms have been incorporated at the edges of the pores.

In some embodiments, the pores of the two-dimensional material are functionalized. In embodiments, the pore functionalization is selected to provide or enhance selectivity of one species over another. Functionalization of the pores can provide a variety of interactions between the functional groups and gas molecules or atoms in the vicinity of the functional group. These interactions may be attractive or repulsive. In examples, the interaction is in the form of steric hindrance, coulombic interaction, steric shielding, hydrogen bonding or other weak intermolecular bonding. For example, a functional group which provides steric hindrance can reduce the effective pore size and allow or enhance separation of two gases with different kinetic radii. As another example, the functional group is selected to allow separation of gases with differences in polarity.

In additional embodiments, the surface of the two-dimensional material is functionalized. In embodiments, functionalization of the surface of the two-dimensional material affects adsorption and/or diffusion of gas species over the surface. In an example, surface functionalization that enables hydrogen bonding capability affects adsorption of more polar gas molecules or gas molecules with unbonded hybrid electron orbitals. Exemplary functional groups include —O, —OH, and —COOH functionalities.

A variety of groups may be used for functionalization of the pores and/or the surface of the two-dimensional material. In some embodiments, the two-dimensional material is functionalized with oxygen moieties. For example, an etching process may be used to achieve such functionalization. Subsequently, the oxygen functionalities can be reacted via a chemistry that converts the oxygenated functionalities. In additional embodiments, the two dimensional material is functionalized with moieties comprising oxygen, nitrogen, phosphorus, sulfur, fluorine, chlorine, bromide, iodine or combinations thereof. In further embodiments, the two-dimensional material is functionalized with moieties comprising boron, hydrogen, lithium, magnesium, aluminum, silicon or combinations thereof. In embodiments, the moieties may be charged moieties, hydrophobic moieties, or hydrophilic moieties. In particular embodiments, the two-dimensional material is functionalized with hydrogen, nitrogen, oxygen or combinations thereof. In additional embodiments, the two-dimensional material is functionalized with polar functional groups such as hydroxyl groups, carboxyl groups and amino (e.g. —$NH_2$) groups.

The present disclosure is directed, in part, to methods for conducting gas separation using perforated graphene or another two dimensional material. The present disclosure is also directed, in part, to separation membranes formed from graphene or another two dimensional material. The present disclosure is also directed, in part, to methods for fabricating a separation membrane containing graphene or another two dimensional material.

Graphene has garnered widespread interest for use in a number of applications due to its favorable mechanical, thermal and electronic properties. Graphene represents an atomically thin layer of carbon in which the carbon atoms reside as closely spaced atoms at regular lattice positions. The regular lattice positions can have a plurality of defects present therein, which can occur natively or be intentionally introduced to the graphene basal plane. Such defects will also be equivalently referred to herein as "apertures," "perforations," or "holes." The term "perforated graphene" will be used herein to denote a graphene sheet with defects in its basal plane, regardless of whether the defects are natively present or intentionally produced. Aside from such apertures, graphene and other two-dimensional materials can represent an impermeable layer to many substances. Therefore, if they can be sized properly, the apertures in the impermeable layer can be useful for only allowing substances meeting certain size criteria through the impermeable layer.

In an embodiment, a dense polymeric membrane is substantially nonporous. In an embodiment, gas transport through a nonporous membrane occurs at least in part through a solution-diffusion mechanism. As disclosed herein the performance of polymer membranes could be improved by inserting a molecular sieve barrier into the polymer, specifically a molecular sieve barrier formed from graphene or a like two-dimensional material. In particular, the inventors recognized that perforated graphene could be used in a gas separation membrane to provide improved gas separation properties. Perforated graphene can be produced by any suitable technique, such as disclosed in commonly owned United States Patent Application Publication 2012/0048804, which is incorporated herein by reference in its entirety. In this regard, the extreme thinness of graphene reflects that molecular transport across the membrane can involve the least possible driving energy, and there are not believed to be distinct "dissolution" and "evaporation" steps involved during transport across its atomic lattice.

The use of graphene in gas separation processes can allow very selective separation processes to take place with various gases. For example, use of graphene in separating a mixture of $CO_2$ and methane can result in a selectivity ratio of about 10,000:1. By carefully choosing the perforation size within the graphene basal plane, graphene can allow complex gas mixtures to be separated that are not able to be efficiently handled using existing processes.

In addition to the foregoing benefits, permeation rates across the graphene can be "tuned" via specialized chemical functionalization of the graphene, such as along its edges, thereby providing an additional means of designing membranes for specific separation applications. Moreover, because the membranes described herein represent a layered structure with atomically thin layers of graphene embedded therein, the mass and footprint of the present membranes are not significantly different than existing polymeric membranes, while still achieving improved gas separation performance.

Further to the above, graphene-containing gas separation membranes can further offer reduced pressure sensitivity requirements, improved chemical inertness, and the opportunity to functionalize the surface of the graphene. Functionalization, in particular, can be used to tailor the graphene's performance during various separation operations.

In various embodiments, the gas separation membranes described herein can include one or more layers of a polymer and one or more layers of perforated graphene. Polymers suitable for use in the gas separation membranes can include those that are used in conventional gas separation membranes. The perforated graphene can be produced by any technique, known or presently unknown, used for introducing a plurality of holes in graphene. Suitable techniques can include plasma treatment, ion or other particle beams, chemical modifications, and the like. The holes in the graphene can be sized such that they render the graphene impermeable to gases that are larger than the hole size. In various embodiments, the perforations can range between about 0.2 nm to about 15 nm in size, from 3 to 15 angstroms in size, from 3 to 10 angstroms in size or from 3 to 6 angstroms in size.

Benefits that can be conveyed by the polymer in the gas separation membranes can include support of the graphene and conveyance of some gas separation properties in their own right. In illustrative embodiments, the polymer can include a fluorocarbon polymer, such as polytetrafluoroethylene, or a silicone polymer. In addition, the polymer can provide good tensile strength and good tensile elongation properties. Moreover, some polymers can be flexible as thin layers and exhibit high glass transition temperatures. All of these properties can be complementary to the graphene and its properties and support its combination therewith in forming a gas separation membrane.

Benefits that can be conveyed by the graphene in the gas separation membranes can include extreme molecular separation capabilities at high permeability. The extreme thinness of graphene (e.g., 0.3-3 nm) can enhance these features. Moreover, graphene exhibits high tensile strength (~106 GPa), excellent chemical stability, and thermal stability above 400° C. Again, the graphene properties can well complement those of the polymer in forming a gas separation membrane.

Several parameters are known in the art to characterize transport through membranes. As used herein, the flux ($J_i$) refers to the number of moles, volume or mass of a specified component i passing per unit time through a unit of membrane surface area normal to the thickness direction (SI/metric Units: mol m$^{-2}$ s$^{-1}$ or m$^3$ m$^{-2}$ s$^{-1}$). As used herein, the permeance or pressure normalized flux refers to the transport flux per unit transmembrane driving force (SI/metric Units: mol m$^{-2}$ s$^{-1}$Pa$^{-1}$ or m$^3$ m$^{-2}$ s$^{-1}$ kPa$^{-1}$. As used herein, the permeability refers to the transport flux per unit transmembrane driving force per unit membrane thickness ($P_i$=product of permeance and thickness for gases SI/metric Units: mol m$^{-1}$ s$^{-1}$ Pa$^{-1}$ or m$^3$ m m$^{-2}$ s$^{-1}$ kPa$^{-1}$). Other units for permeability include the Barrer, defined as 1 Barrer=$10^{-10}$ cm$^3$ cm cm$^{-2}$ s$^{-1}$ cmHg$^{-1}$, which is equal to 7.5×$10^{-11}$ cm$^3$ cm cm$^{-2}$ s$^{-1}$ kPa$^{-1}$ or 7.5×$10^{-11}$ cm$^3$ cm$^{-1}$ s$^{-1}$ kPa$^{-1}$. Techniques for measuring these parameters for conventional membranes are known to those skilled in the art.

FIG. 1 shows a schematic of an illustrative graphene-based gas separation membrane of the present disclosure and an exemplary method for its fabrication. As shown, the graphene layer (10) is made on a layer of copper (50). A polymer layer (20) is then spun on the graphene layer (10) and annealed. A stamp (60) is applied to the polymer layer before the copper is removed through etching. The graphene layer is perforated and then transferred to a substrate (80). The stamp is then removed, producing the polymer and graphene layered upon one another on a substrate. Although FIG. 1 shows perforation of the graphene with Xe ions, other perforation processes can be used. Moreover, the graphene can be perforated before or after being layered with the polymer.

Referring still to FIG. 1, a simple molding process can be used to embed large areas of graphene into polymer matrices, such as an exemplary siloxane (PDMS) rubber matrix. The rubber matrix can mechanically support and protect the graphene, while the graphene layer lends new separation capabilities to the composite membrane, as described above. Substantially impermeable membranes are also possible by embedding un-perforated graphene layers in a polymer stack.

The bulk polymer membrane can operate normally by solution-diffusion processes, giving some separation of gas species. The embedded graphene sieve filter (i.e., perforated graphene layers) can block or inhibit diffusion of molecules larger than the holes in the graphene, while at the same time permitting diffusion of smaller molecules. Thus, the composite membrane can separate gas species by two complementary mechanisms: solution-diffusion at the polymer (i.e., molecule-polymer interaction) and molecule size sieving. In this regard, the two-dimensional sieve barrier can provide very high permeability contrast at a threshold molecular size, allowing high separation ratios based upon size to be realized (e.g., $CO_2$ compared to methane). If the hole-size density in the graphene layer is sufficiently high, the graphene layer can convey very little added resistance to permeation of small molecules. Accordingly, the higher selectivity provided by the graphene layer can allow for a much thinner polymer membrane to be used, compared to solely polymer-containing membranes.

Due to the complementary solution-diffusion separation provided by the polymer, enhanced separation capabilities can be further realized. For example, when separating $H_2S$ from methane, $H_2S$ separation can take place in a silicone-rubber polymer (silicone-rubber has high affinity for separating $H_2S$) even if the graphene layer doesn't separate these species efficiently. With a proper selection of polymer type, polymer thickness, graphene hole size, graphene hole density, and graphene hole functionalization, composite membranes of this type can be designed that are capable of high selectivity across a wide range of molecular types while preserving or even enhancing overall separation efficiency (in terms of flux of separating species passing therethrough).

A membrane that can simultaneously handle both high $CO_2$ and $H_2S$ gas concentrations would extend the range of applications for membrane separations in natural gas processing. If such a membrane could simultaneously remove these gases from natural gas in a single process step, it would eliminate the need for separate cleaning processes for these contaminants, thereby reducing overall process costs and complexity. In this regard, various gas separation membranes described herein can be used in separating natural gas from various contaminant gases therein. The methods can include contacting as-produced or partially purified natural gas with the described separation membranes. Other gas mixtures can be purified in a like manner by appropriately sizing the holes in the graphene layer.

Other new functionalities are also possible by the foregoing composite membrane approach. For example, graphene is electrically conductive and can be built into a multi-layer composite stack with graphene layers separated by dielectric layers and electrically connected to a voltage source to enable capacitive charging between layers. Such an arrangement can be used to electrophoretically or dielectrophoretically control the movement of charged or polar particles between charged graphene electrode layers. If the graphene layers are perforated, the motion of molecules entering thorough graphene pores can be controlled between graphene layers by application of an appropriate voltage waveform to the graphene layers. Thus, molecular transport between graphene layers can be controllably retarded or enhanced in accordance with these embodiments. Such an arrangement can effectively represent a switchable membrane "gate" through which transport can be reduced or enhanced at will. Other versions are also possible for the case of uncharged or non-polar particles or very small particles (molecules). For example, electrical heating of embedded graphene layers can be used to force interlayer material phase changes (for example from a glassy state to liquid or back), thereby providing further control options over molecular transport between layers.

In addition to the foregoing uses in gas separation described hereinabove, it is to be recognized that the membranes described herein can also be used in a variety of other applications. Illustrative processes can include, for example, reverse osmosis filters, integrated circuits, flat panel displays, electrodes, flexible solar cells, desalination, and other molecular filtration processes, both in the gas and liquid phases.

Although the disclosure has been described with reference to the disclosed embodiments, one having ordinary skill in the art will readily appreciate that these are only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. One of ordinary skill in the art will appreciate that methods, device elements, starting materials and synthetic methods other than those specifically exemplified can be employed in the practice of the invention without resort to undue experimentation. All art-known functional equivalents, of any such methods, device elements, starting materials and synthetic methods are intended to be included in this invention. Whenever a range is given in the specification, for example, a temperature range, a time range, or a composition range, all intermediate ranges and subranges, as well as all individual values included in the ranges given are intended to be included in the disclosure. When a Markush group or other grouping is used herein, all individual members of the group and all combinations and subcombinations possible of the group are intended to be individually included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general the terms and phrases used herein have their art-recognized meaning, which can be found by reference to standard texts, journal references and contexts known to those skilled in the art. The preceding definitions are provided to clarify their specific use in the context of the invention.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

We claim:

1. A composite permeable membrane for separation of a first gas from a second gas; said composite permeable membrane comprising:
    at least one layer of a perforated permeable two-dimensional material; and
    at least one membrane of a material other than a two-dimensional material, said membrane being characterized by a permeability for said first gas greater than or equal to 1 Barrer,
    wherein said composite permeable membrane is constructed of said at least one layer of the perforated permeable two-dimensional material and said at least one membrane and arranged to provide preferential transport of said first gas relative to said second gas through said at least one membrane and said at least one layer of said perforated permeable two-dimensional material,
    wherein said at least one membrane and said at least one layer of said perforated permeable two-dimensional material are provided in a stacked multilayer geometry, and
    wherein said each of said at least one layer of said perforated permeable two-dimensional material provided in said stacked multilayer geometry is independently positioned between first and second adjacent membranes.

2. The composite membrane of claim 1, wherein a net gas separation selectivity for said first gas relative to said second gas is greater than or equal to 100.

3. The composite permeable membrane of claim 1, wherein each of said membranes independently provides separation of said first gas and second gas.

4. The composite permeable membrane of claim 1, wherein at least one of said membranes is an inorganic molecular sieve membrane.

5. The composite permeable membrane of claim 1, wherein each of said membranes is capable of exposure to at least one of (a) a pressure of 500 psi without undergoing mechanical failure and (b) temperatures up to 300 K without undergoing chemical or physical degradation.

6. The composite permeable membrane of claim 1, wherein each of said membranes independently has a thickness selected over the range of 0.1 to 50 microns.

7. The composite permeable membrane of claim 1, wherein each of said at least one layer of perforated permeable two-dimensional material is independently characterized by a thickness selected from the range of 0.3 to 5 nm.

8. The composite permeable membrane of claim 1, wherein each of said at least one layer of perforated permeable two-dimensional material is independently characterized by a plurality of holes independently having cross sectional dimensions less than or equal to 10 angstroms.

9. The composite permeable membrane of claim 1, wherein each of said at least one layer of perforated permeable two-dimensional material independently comprises perforated graphene, a perforated graphene-based material, a perforated transition metal dichalcogenide, perforated molybdenum disulfide, perforated α-boron nitride, silicone, perforated germanene, or a combination thereof.

10. The composite permeable membrane of claim 1, wherein each of said layers of perforated permeable two-dimensional material is independently comprises a perforated permeable graphene-based material.

11. The composite permeable membrane of claim 10, wherein said perforated permeable graphene-based material comprises perforated single-layer graphene, perforated multi-layer graphene or perforated multiple layers of single layer graphene.

12. The composite permeable membrane of claim 1, wherein the first membrane is in physical contact with a first layer of said perforated permeable two-dimensional material.

13. The composite permeable membrane of claim 12, wherein said first layer of said perforated permeable two-dimensional material is provided between, and in physical contact with, said first and second membranes.

14. A method for separating a first gas from a second gas; said method comprising the steps of:

providing a composite permeable membrane comprising:
at least one layer of a perforated permeable two-dimensional material;
at least one membrane of a material other than a two-dimensional material, said membrane being characterized by a permeability for said first gas greater than or equal to 1 Barrer,
wherein said at least one membrane and said at least one layer of said perforated permeable two-dimensional material are provided in a stacked multilayer geometry, and
wherein said each of said at least one layer of said perforated permeable two-dimensional material provided in said stacked multilayer geometry is independently positioned between first and second adjacent membranes;
contacting an external surface of said composite permeable membrane with said first gas and said second gas; and
applying a driving force for transport of the first gas across the composite permeable membrane wherein said composite membrane provides preferential transport of said first gas relative to said second gas through said at least one membrane and said at least one layer of perforated permeable two-dimensional material, thereby separating said first gas from said second gas.

15. The method of claim 14, wherein methane is said second gas and said first gas is selected from the group consisting of $CO_2$, $H_2O$, $H_2S$ or any combination of these and the first gas and the second gas are provided in a natural gas.

16. The method of claim 14, providing a method of $N_2$ purification or $CO_2$ purification.

17. The method of claim 14, providing a method of revitalizing air.

18. The method of claim 14 wherein at least one of said membranes is an inorganic molecular sieve membrane.

19. The composite permeable membrane of claim 1, wherein at least one of a plurality of pores or a surface of the at least one layer of the perforated permeable two-dimensional material is functionalized.

20. The composite permeable membrane of claim 19, wherein the at least one layer of the perforated permeable two-dimensional material is functionalized with moieties of at least one of oxygen, nitrogen, phosphorus, sulfur, fluorine, chlorine, bromide, or iodine.

* * * * *

UNITED STATES PATENT AND TRADEMARK OFFICE
CERTIFICATE OF CORRECTION

PATENT NO. : 9,610,546 B2  Page 1 of 1
APPLICATION NO. : 14/856198
DATED : April 4, 2017
INVENTOR(S) : Steven W. Sinton et al.

It is certified that error appears in the above-identified patent and that said Letters Patent is hereby corrected as shown below:

Claim 10, Column 19, Line 33:
Delete "*comprises*"

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*